United States Patent [19]

Naruto et al.

[11] Patent Number: 5,031,048
[45] Date of Patent: Jul. 9, 1991

[54] ELECTRIC SHUTTER CONTROL DEVICE FOR USE IN A STILL VIDEO CAMERA, FOR EXAMPLE, AND A METHOD OF CONTROLLING SAME

[75] Inventors: Hirokazu Naruto; Kazuchika Sato; Nobuyuki Taniguchi, all of Osaka, Japan

[73] Assignee: Minolta Camera Kabushiki Kaisha, Osaka, Japan

[21] Appl. No.: 390,763

[22] Filed: Aug. 8, 1989

[30] Foreign Application Priority Data

Aug. 9, 1988 [JP] Japan .................. 63-199281
Oct. 18, 1988 [JP] Japan .................. 63-262557
Nov. 11, 1988 [JP] Japan .................. 63-286539

[51] Int. Cl.⁵ ............................................. H04N 3/14
[52] U.S. Cl. ............................ 358/213.19; 358/228
[58] Field of Search ............. 358/213.19, 228, 213.22, 358/213.26, 909

[56] References Cited

U.S. PATENT DOCUMENTS

| 4,831,453 | 5/1989 | Takemura | 358/213.19 |
| 4,875,101 | 10/1989 | Endo et al. | 358/213.19 |
| 4,908,709 | 3/1990 | Inuiya et al. | 358/213.19 |
| 4,914,518 | 4/1990 | Suga | 358/213.19 |

FOREIGN PATENT DOCUMENTS

| 58-31672 | 2/1983 | Japan . |
| 58-63276 | 4/1983 | Japan . |
| 59-8478 | 1/1984 | Japan . |
| 59-80069 | 5/1984 | Japan . |
| 60-249480 | 12/1985 | Japan . |
| 59-80069 | 5/1984 | Japan . |

Primary Examiner—Stephen Brinich
Attorney, Agent, or Firm—Burns, Doane, Swecker & Mathis

[57] ABSTRACT

An electronic shutter control system provided with an imaging device, a driving circuit to drive and control the imaging device and an exposure control circuit to output a signal to the drive circuit. The shutter opens in synchronization with a signal to read out electric charge in a photoelectric converter section to a vertical transfer section. The vertical transfer section is held in a state enabling readout of the signal after cleaning out an unnecessary electric charge. As a result, an electric charge is read out simultaneously with the close of the shutter. According to an electronic shutter controlling method, fast reverse transfer is stopped at a level of the proper exposure less the predetermined amount and an electric charge signal is read out to the vertical transfer section, waiting for the potential of the vertical transfer section to achieve a state wherein it can receive the electric charge signal.

5 Claims, 18 Drawing Sheets when FI1=L when FI1=M when FI1=H
(reading-out of stored electric charge to transfer when FSA is super posed)

ELECTRIC SHUTTER CONTROL DEVICE FOR USE IN A STILL VIDEO CAMERA, FOR EXAMPLE, AND A METHOD OF CONTROLLING SAME

BACKGROUND OF THE INVENTION

This invention relates to an electronic shutter control device used for a still video camera, etc, and a method for controlling the same.

So-called electronic shutter using a CCD which is a solid imaging device is generally used in a still video camera, etc. In a conventional shutter driving device in the still video camera, readout of an image signal representing an electric charge accumulated in the CCD (hereinafter referred to as an electric charge signal) to a vertical transfer section is synchronized with the vertical synchronous signal in an image processing circuit (for example, refer to "Television Technology", Aug. 1987, pp. 37-39).

This is necessary because a vertical transfer section in the CCD is provided to receive an electric charge signal from a photoelectric converter section in the CCD, the electric charge signal is read out as a TV signal and image recording is made at predetermined intervals, i.e., fundamentally a movie.

In this prior art shutter control device, since said reading out of the electric charge signal to the vertical transfer section, i.e., the shutter closure is synchronized with a video vertical synchronous signal, timing of the shutter open timing is restrictedly determined at a timing preceding to a desired exposure time from the vertical synchronous timing so as to obtain a proper exposure. Additionally, since shutter release is made irrespective of the vertical synchronous timing, time irregularity may be observed from any release timing to the shutter open timing. Moreover, since the exposure time is obtained in advance of the shutter release on the basis of the light measurement before the shutter release, i.e., the exposure time is not based on the light measurement during the exposure, i.e., the real time photometry, incorrect exposure happens to occur especially at the flash photographing.

Thus, the photometrical precision improvement was limited because the real time photometry could not be realized in the prior art techniques.

Another known method consists in driving an electronic shutter synchronizing with a release switch (for example, refer to the Japanese Laid-Open Patent Publication No. 60-52173), but no consideration to obtain shutter open timing anytime, is given.

SUMMARY OF THE INVENTION

The present invention intends to overcome said shortcomings of the prior art and to provide an electronic shutter control device which permits arbitrary electronic shutter open and close independent of the video vertical synchronous signal timing so as to perform real time photometry during the exposure, and as a consequence, permits improvement in photometrical precision, i.e. exposure precision.

According to the present invention, the shutter open is synchronized with the signal to read out electric charge in the photoelectric converter section to the vertical transfer section, and the vertical transfer section is held in a state enabling readout of the signal after cleaning out unnecessary electric charge, so as to read out electric charge simultaneously with shutter close.

Therefore, it is possible to correspond the shutter open with the real accumulation beginning of electric charge and to read out the electric charge signal to the vertical transfer section with shutter close, and as a consequence, the real time photometry becoming possible, proper exposure control through high accuracy photometry can be realized.

A further object of the present invention is to provide an electronic shutter controlling method which make possible to improvement in exposure precision.

According to the present invention, electronic shutter controlling method comprises, stopping transfer at a level of the proper exposure less the predetermined amount, waiting for becoming a state that the potential of the vertical transfer section can receive an electric charge signal and reading out the electric charge signal to the vertical transfer section. Therefore, the electric charge signal accumulated up to an proper level in the imaging device can be read out anytime to the vertical transfer section, without synchronizing with the vertical synchronous signal, and the real time photometry is made possible so as to realize a shutter with high accuracy of exposure. Furthermore, an unnecessary electric charge in the vertical transfer section being cleaned out during the electric signal accumulation period (exposure period), the smear can be lowered. In flash photography, as the smear is apt to occur during the flash emission, an unnecessary electric charge being always cleaned out, then, the smear can be lowered.

A further object of the present invention is to provide an electronic camera with an electronic shutter driving method which makes possible to improve in accuracy of exposure and realization of correct exposure control for fast shutter.

According to the present invention, the electronic shutter close timing being realized through real time photometry independently from the synchronous signal, a high accuracy of exposure can be maintained and circuits and others for flashing stop, etc. are not necessary. Furthermore, proper exposure control can be achieved even at a high speed shutter operation.

DETAILED DESCRIPTION OF THE PREFERRED EMBODIMENTS

Figure 6:
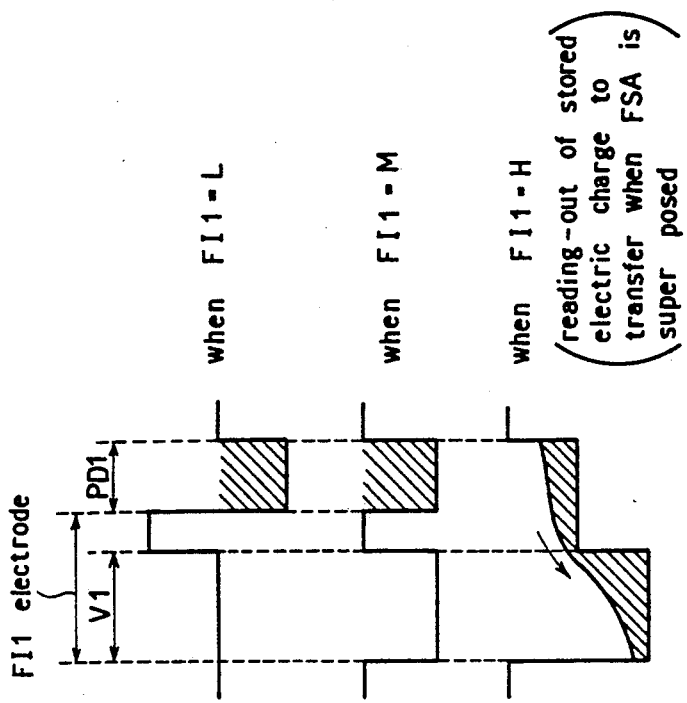
Figure 6:
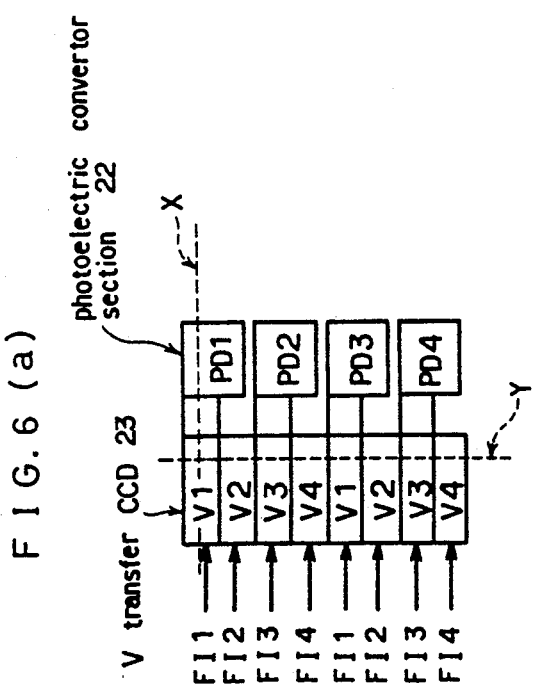
Figure 6:
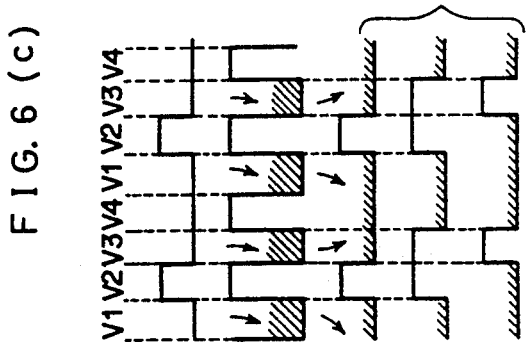
Figure 7:
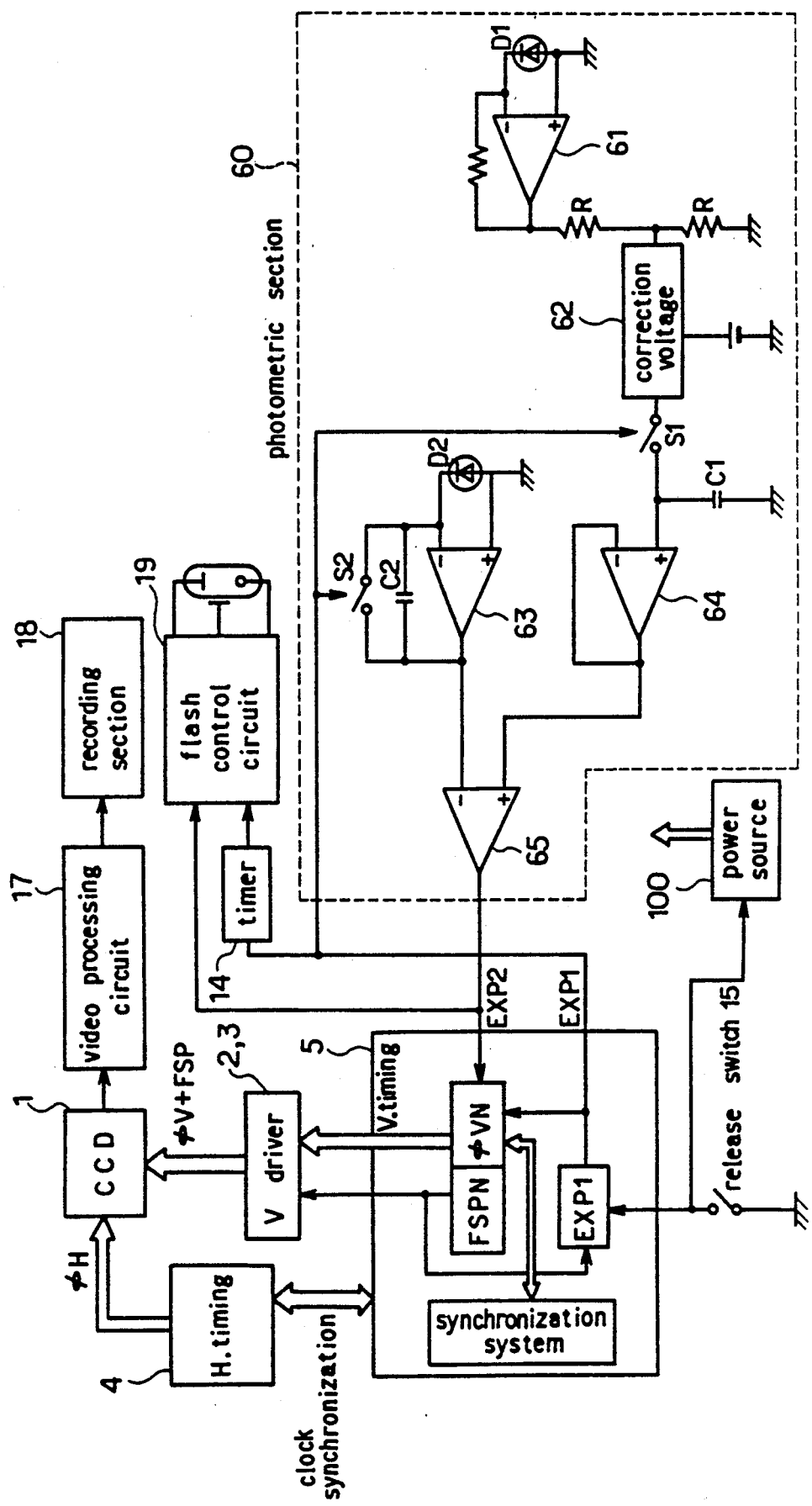
Figure 8:
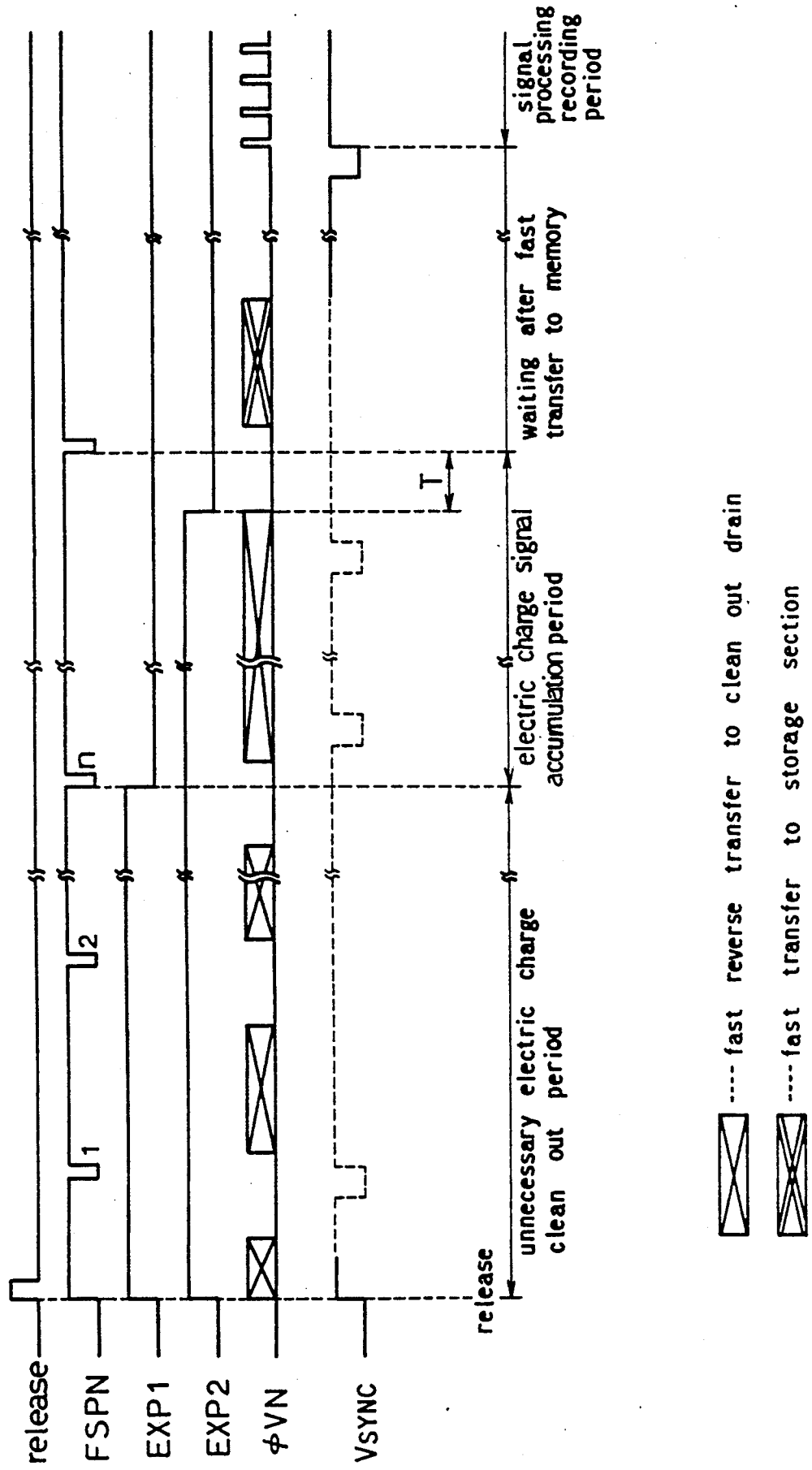
Figure 9:
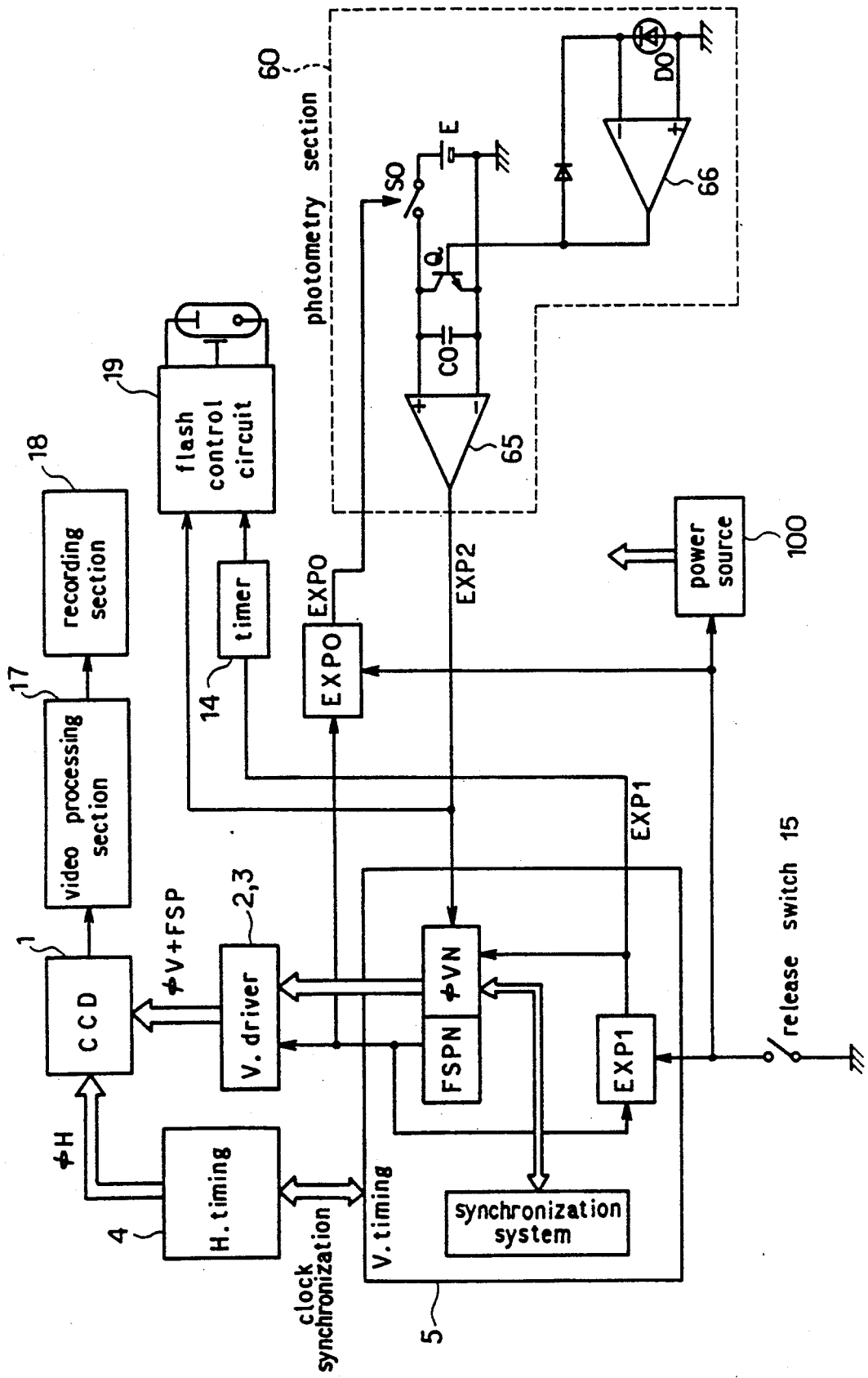
Figure 10:
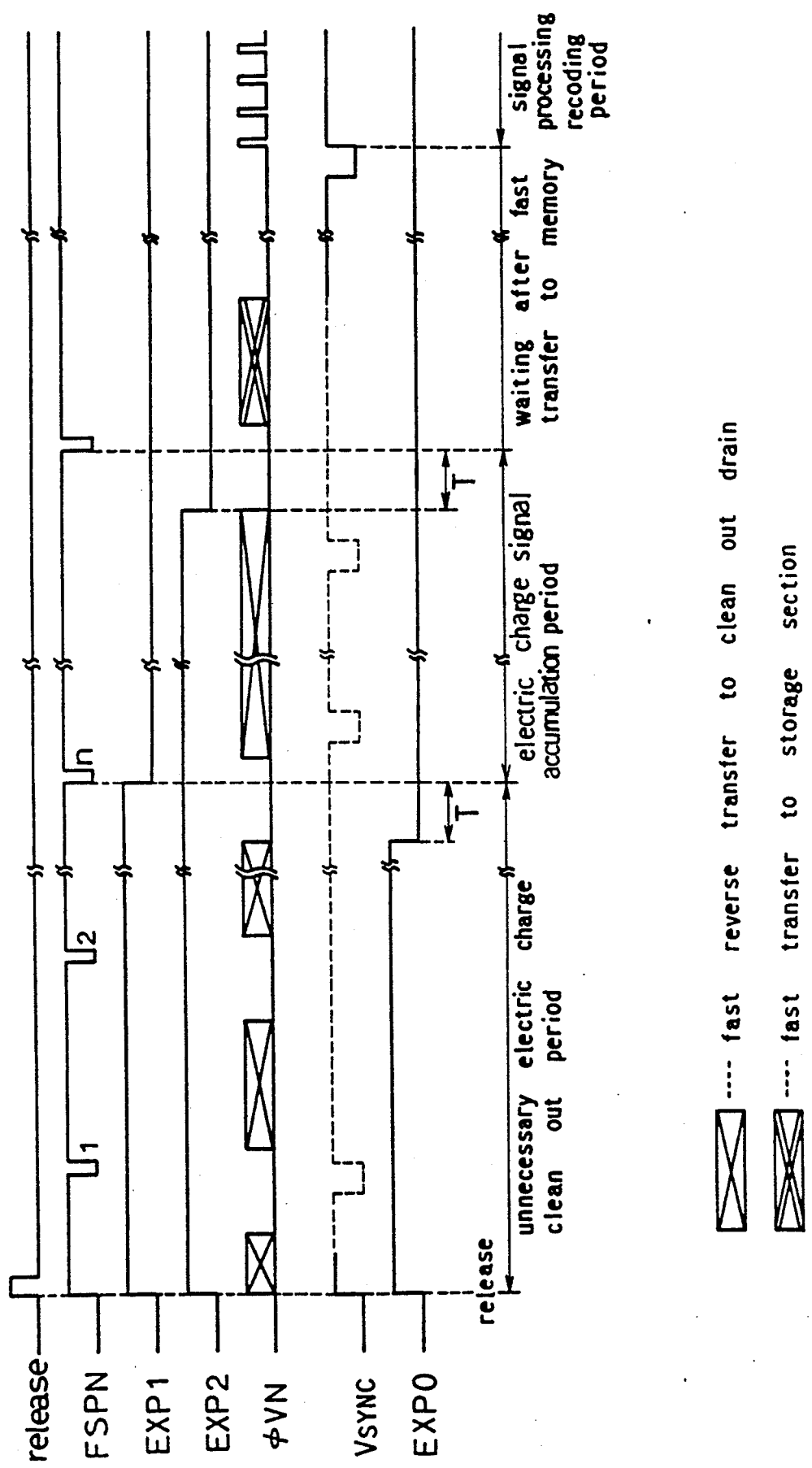
Figure 11:
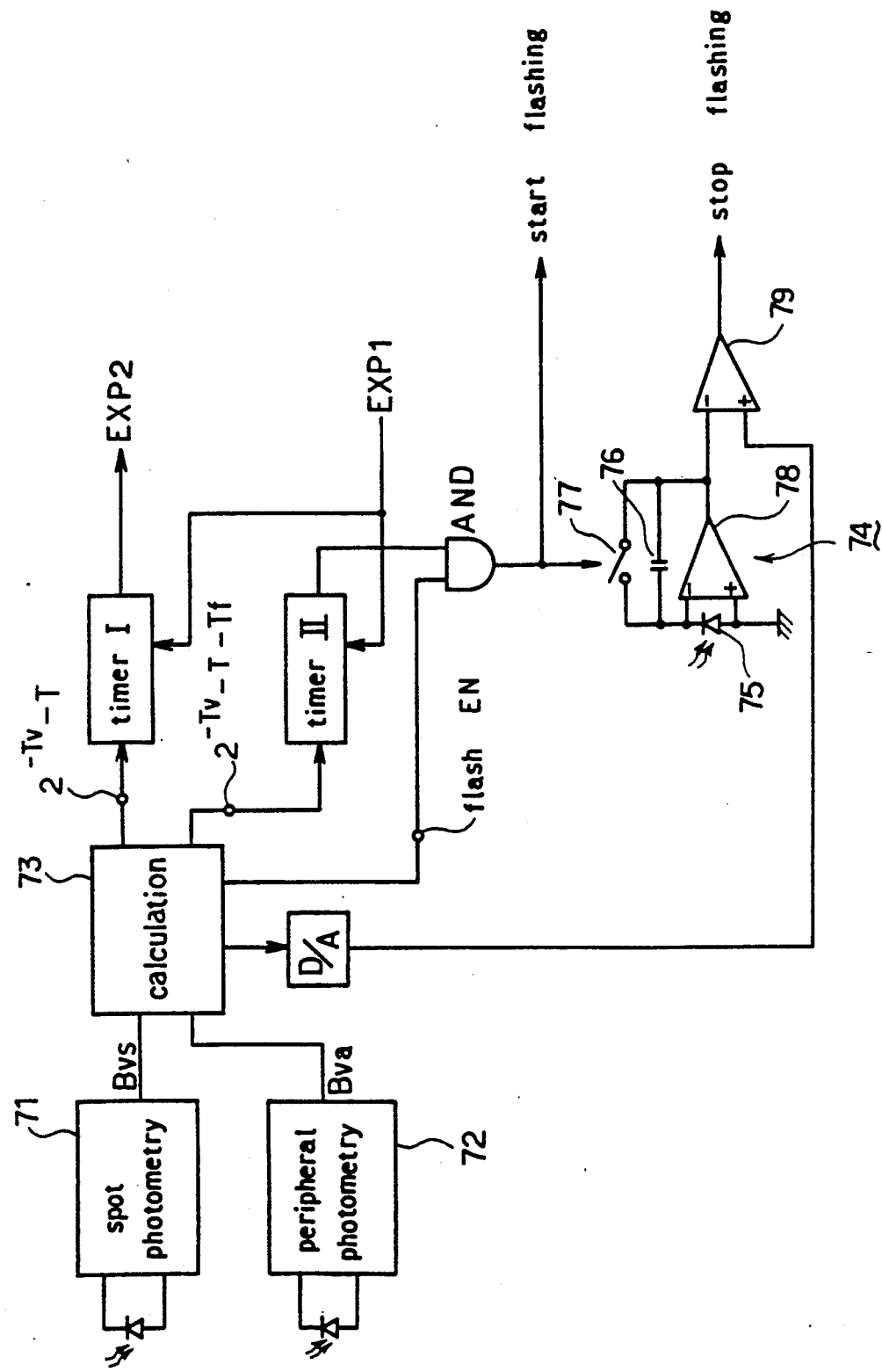
Figure 12:
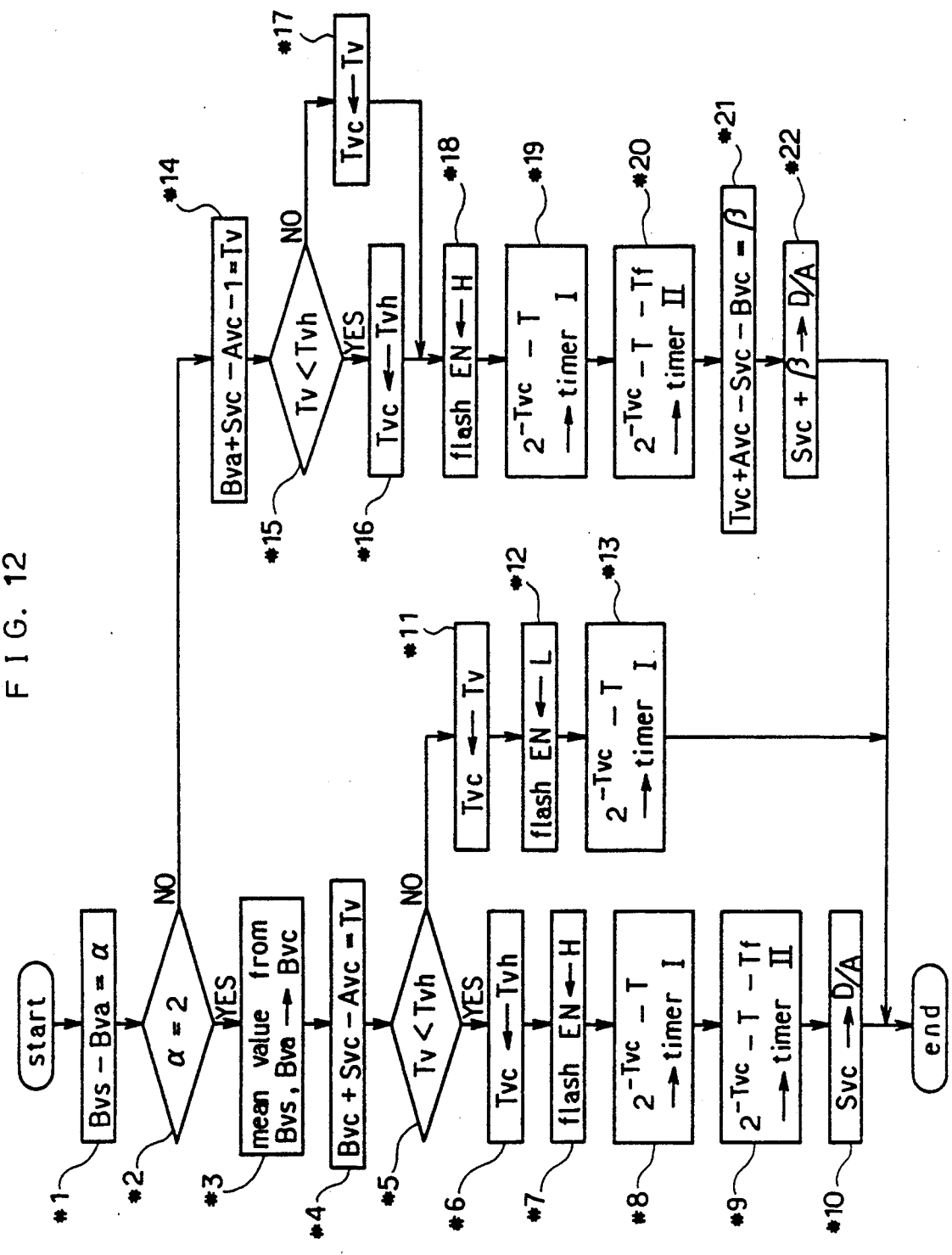
Figure 13:
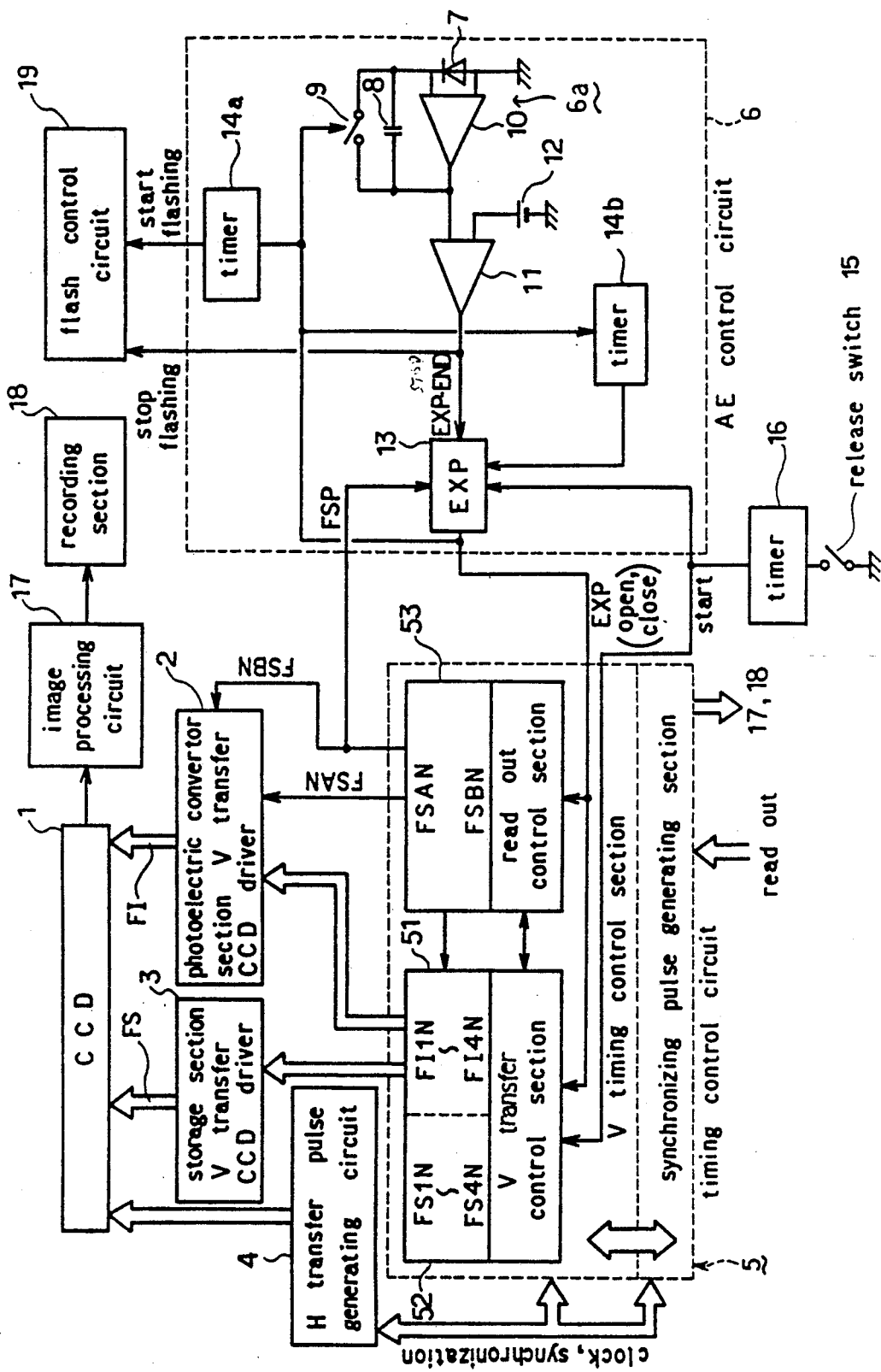
Figure 14:
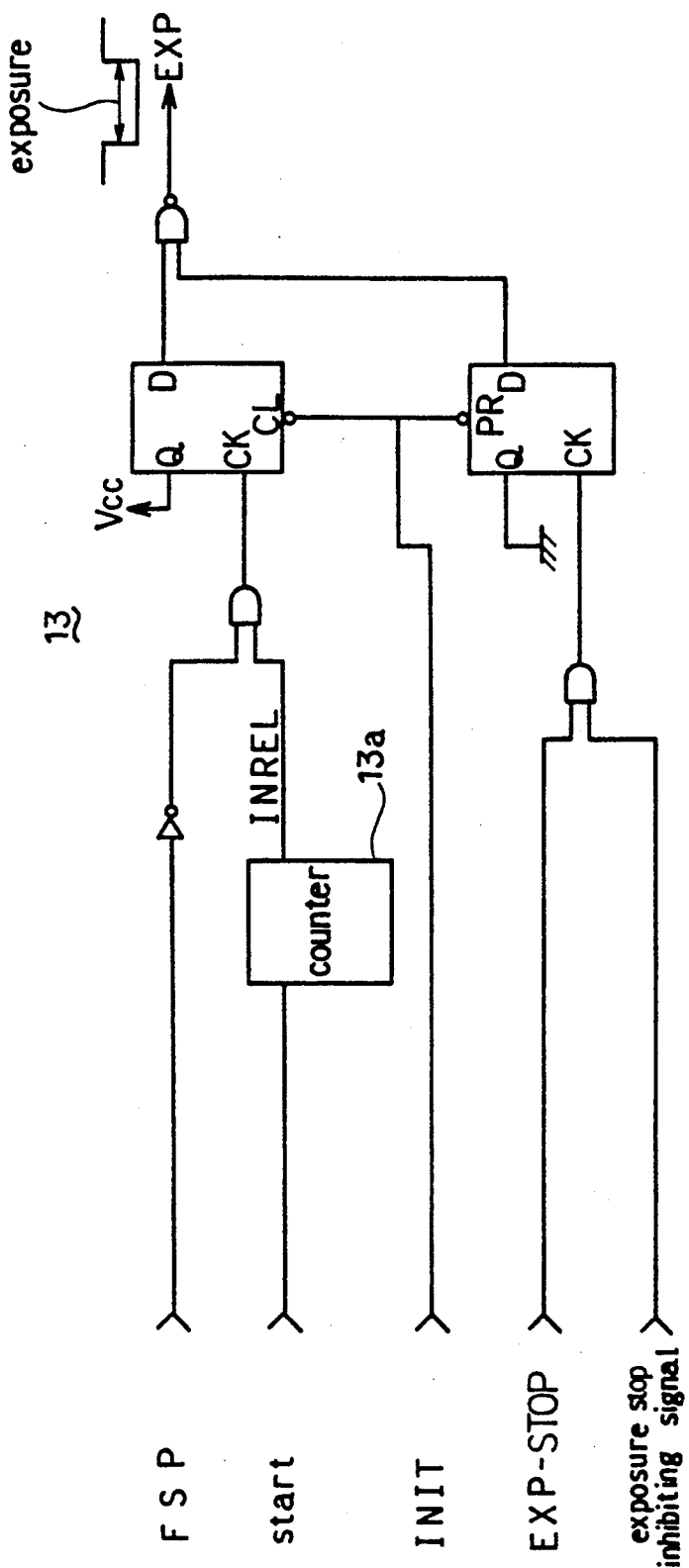
Figure 15:
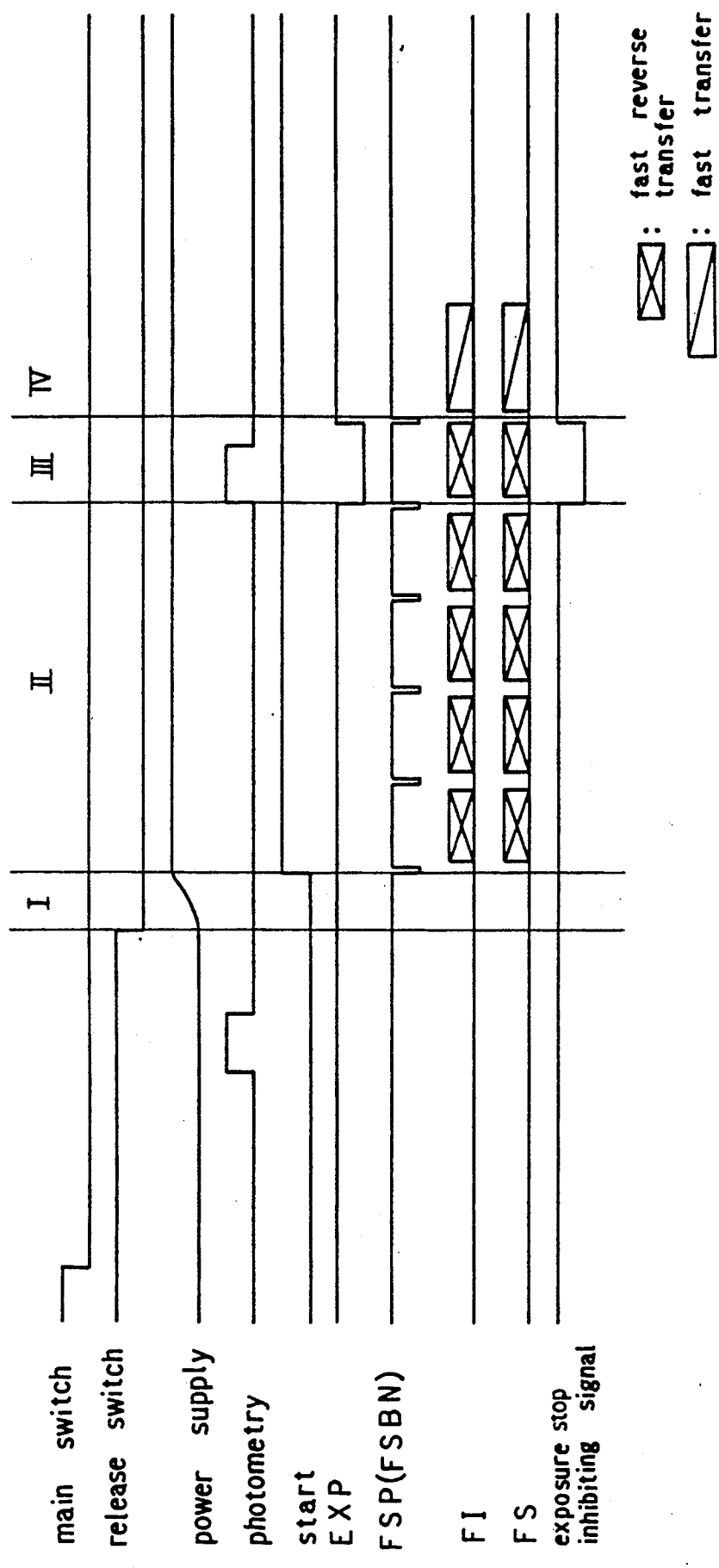
Figure 16:
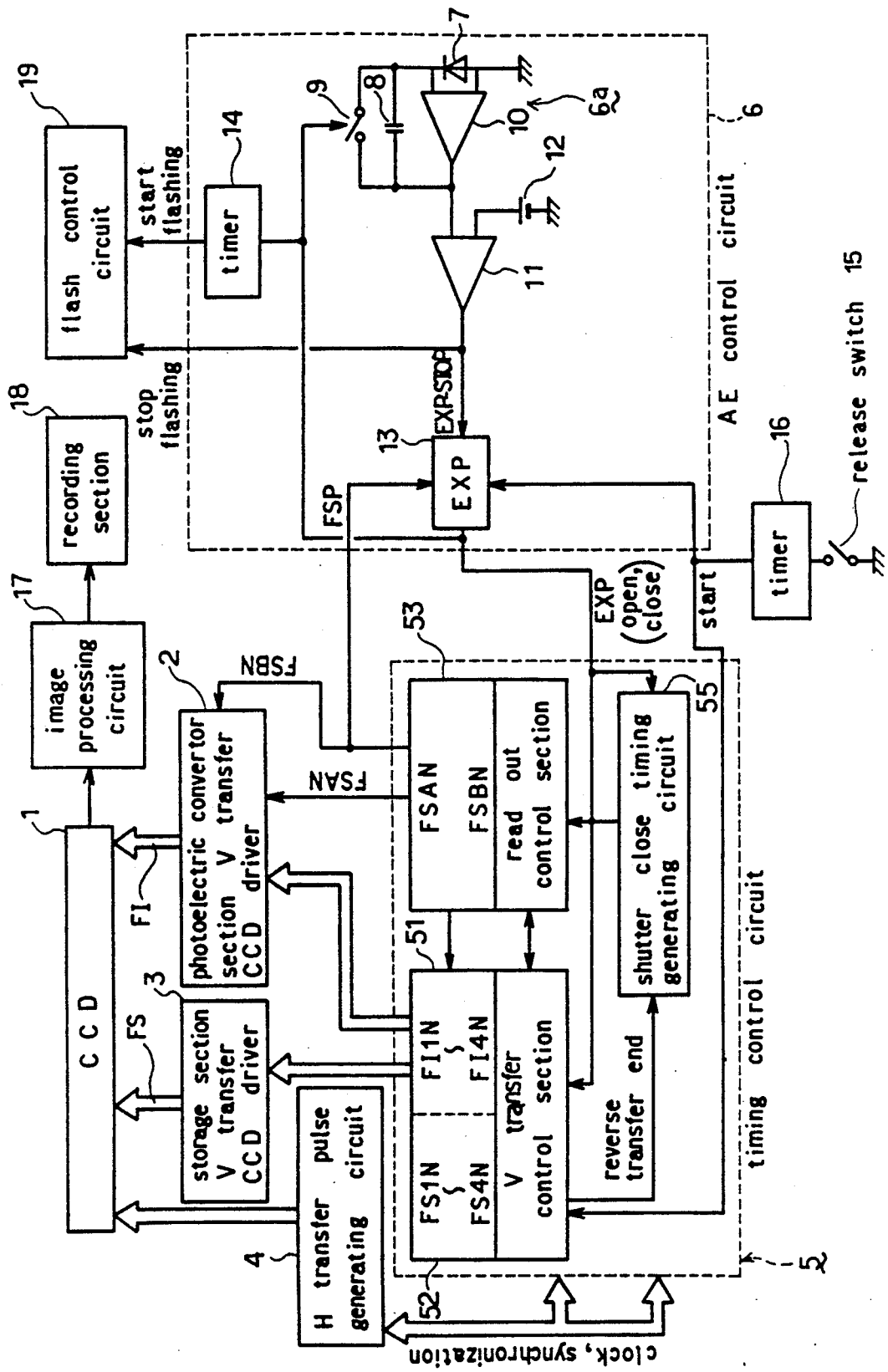
Figure 17:
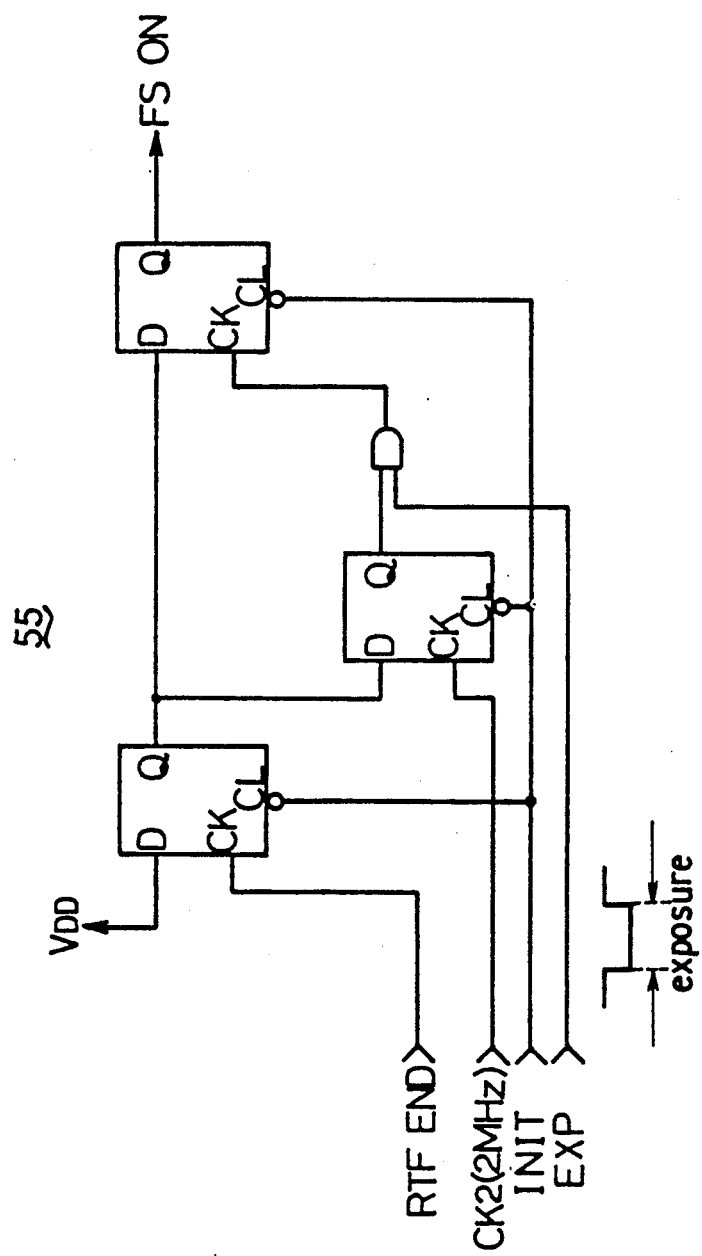
Figure 18:
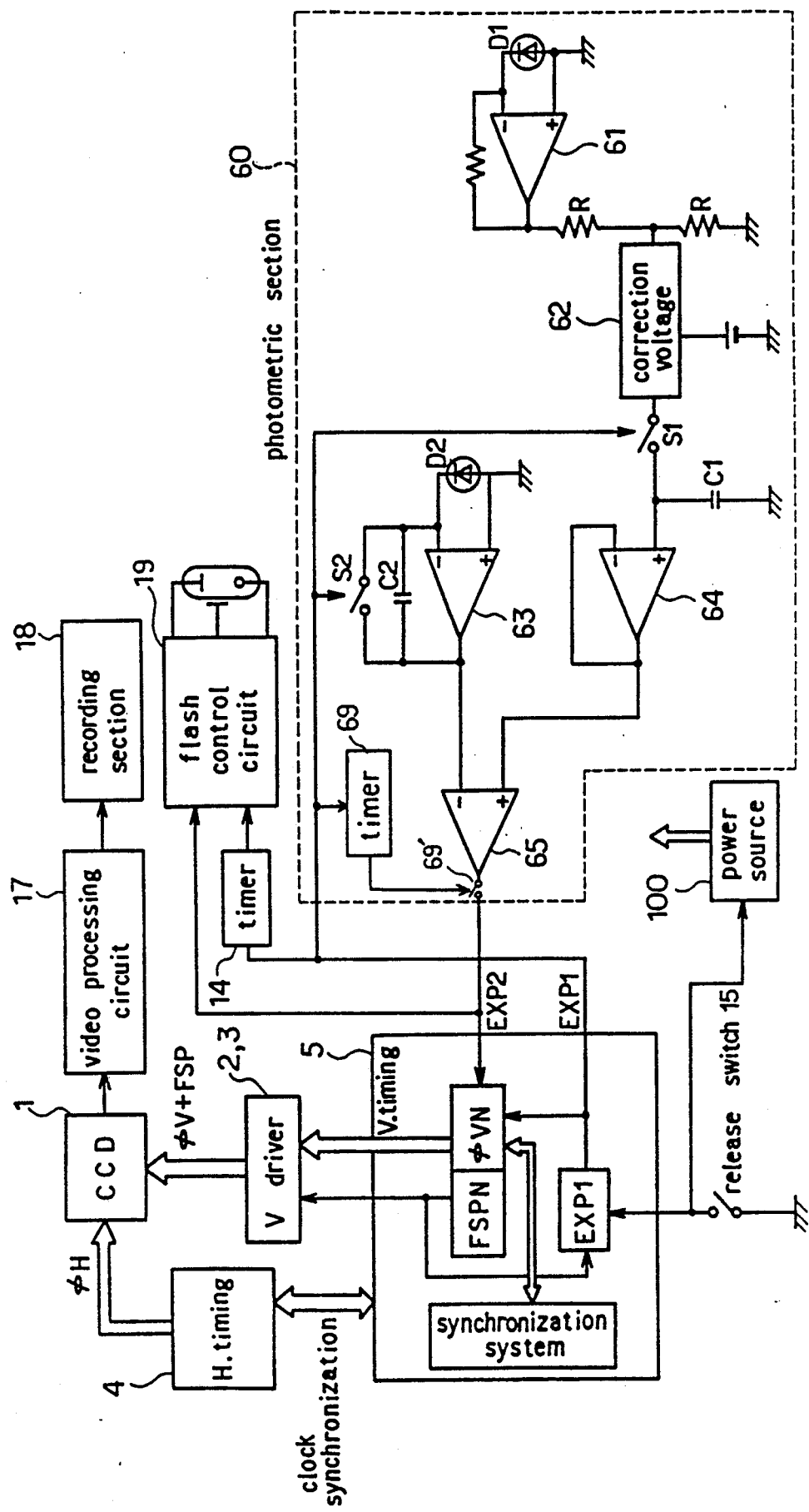

FIG. 6 (a), (b) and (c) are respectively block diagrams explaining operations of a photoelectric converter section and a vertical transfer CCD and a figure showing potential state of each section;

FIG. 7 is a block diagram of a still video camera to which a second embodiment of the present invention is applied;

FIG. 8 is a time chart showing operations of the second embodiment of FIG. 7;

FIG. 9 is a block diagram of a still video camera to which a third embodiment of the present invention is applied;

FIG. 10 is a time chart showing operations of the embodiment of FIG. 9;

FIG. 11 is a block diagram of a photometry section of the third embodiment;

FIG. 12 is a flow chart showing the operation procedure of the third embodiment of FIG. 11;

FIG. 13 is a block diagram of a still video camera to which a fourth embodiment of the present invention is applied;

FIG. 14 is a concrete example of the CCD exposure signal generating circuit of FIG. 13;

FIG. 15 is a time chart showing operations of the fourth embodiment;

FIG. 16 is a block diagram of a still video camera to which a fifth embodiment of the present invention is applied;

FIG. 17 is a diagram showing a concrete example of the shutter close timing generating circuit of FIG. 16; and FIG. 18 is a block diagram of a still video camera to which a sixth embodiment of the present invention is applied.

DESCRIPTION OF THE PREFERRED EMBODIMENTS

Figure 1:
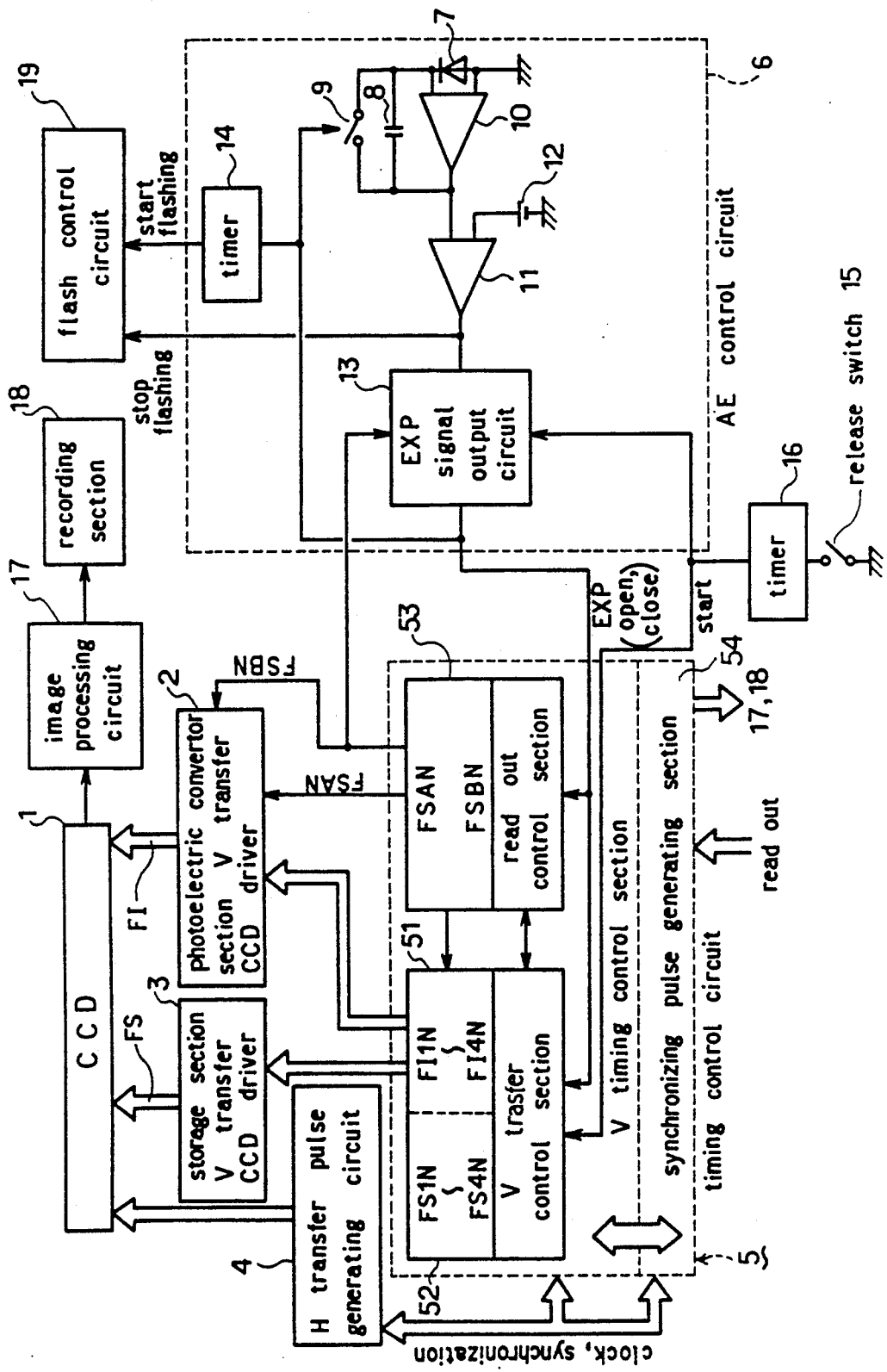
FIG. 1 is a block diagram of a still video camera to which a first embodiment of an electronic shutter control device of the present invention is applied.
Figure 2:
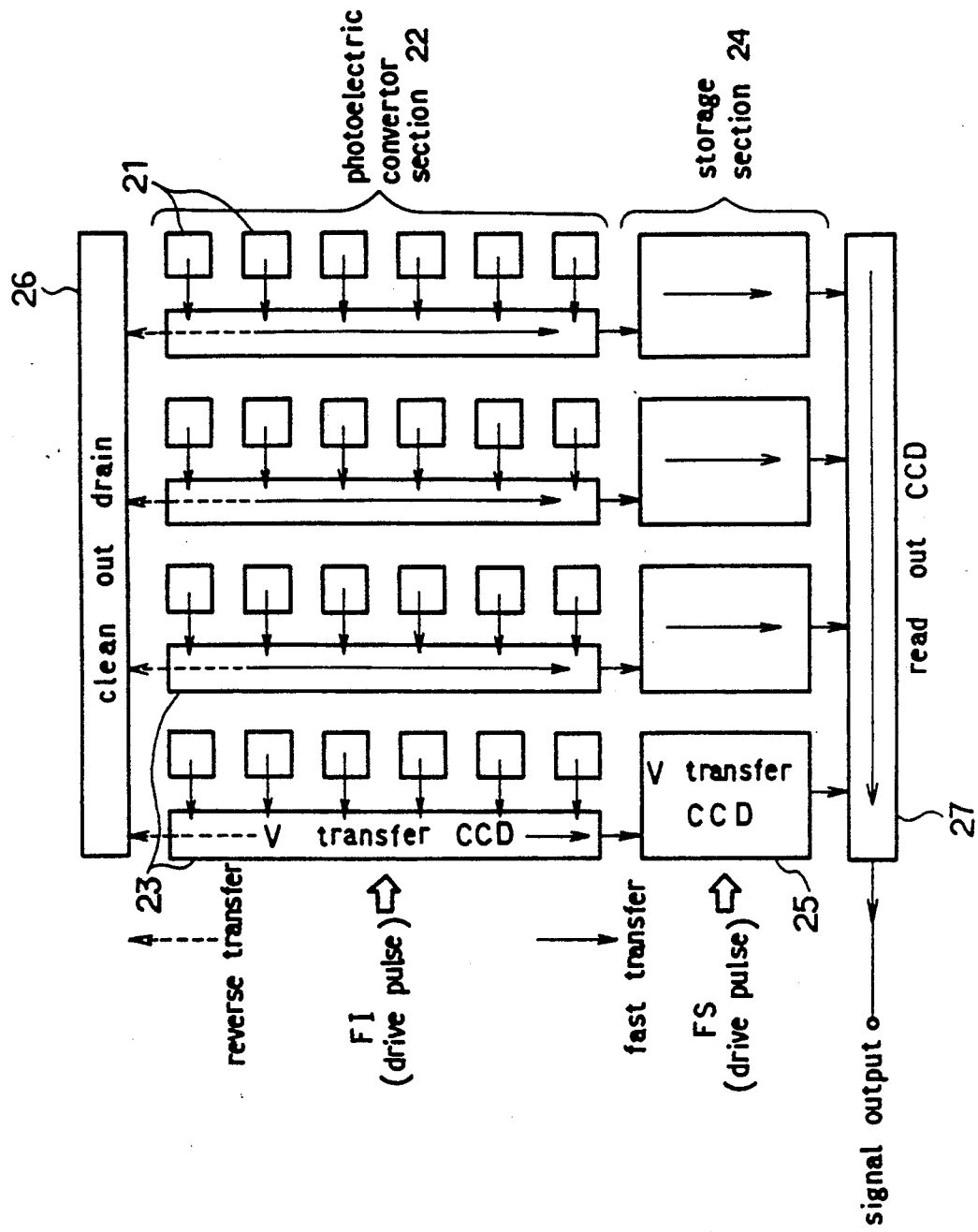
FIG. 2 is a diagram of a CCD shown in FIG. 1.

FIG. 1 shows a circuit diagram of a still video camera to which a first embodiment of an electronic shutter control device of the present invention is implemented in the still video camera. In this figure, a CCD 1 as an imaging device for photoelectric conversion is a main part of an electronic shutter. As shown in FIG. 2, this CCD 1 mainly including a photoelectric conversion image section 22 and a storage section 24, is controlled by receiving driving pulses FI and FS respectively to the vertical transfer CCD 23 of the photoelectric conversion section 22 and to the vertical transfer CCD 25 of the storage section 24. Here, a frame interline transfer (FIT) type is used for CCD 1. The electronic shutter control device shown in FIG. 1 also comprises a vertical transfer CCD driver 2 for the photoelectric conversion section 22 and a vertical transfer CCD driver 3 for the storage section 24 to drive said CCD 1, a synchronous pulse generating circuit 4 for horizontal transfer, and a timing control circuit 5 which outputs signals to both vertical transfer CCD drivers 2 and 3 in order to control open and closure timings of the electronic shutter.

This timing control circuit 5 is composed of a vertical timing control sections 51, 52 and 53 and a TV synchronous pulse generator section 54. The vertical timing control section comprises a circuit 51 which generates driving pulses FIN (FI1-FI4) to a vertical transfer CCD driver 2 for the photoelectric converter section 22, a circuit 52 which generates driving pulses FSN (FS1-FS4) to a vertical transfer CCD driver 3 for the storage section 24 and a circuit 53 which generates pulses FSAN and FSBN (corresponding respectively to a first field and a second field) in order to send out the electric charge accumulated in the photoelectric converter section 20 to the vertical transfer CCD 23.

The automatic exposure control circuit 6 measures actual amount of exposure from the beginning of exposure and outputs an exposure stop signal to the timing control circuit 5 when the predetermined amount of exposure is attained. This automatic exposure control circuit 6 comprises a photometric element 7 monitoring amount of the exposure, a capacitor 8, a switch 9 connected in parallel with the capacitor 8, an operational amplifier 10, a comparator 11, a reference voltage source 12, an output circuit 13 generating a signal to open and close the electronic shutter, in other words, to begin and stop the exposure (called "EXP signal") and a timer 14 which determines a timing of flashing start.

A release switch 15 gives an electronic shutter open command. Timer 16 counts a power source start-up time in response to turn on of the release switch and then sends a START signal to enter sequence for still video photography, to circuits 51, 52 generating pulses FIN, FSN and an EXP signal output circuit 13. An image processing circuit 17 executes signal transfer from CCD 1 at a video rate. An image recording section 18 records a processed signal from the circuit 17 to a recording medium such as a magnetic disk or others. A flash control circuit 19 executes flash emission when the proper exposure value is not attained though the predetermined exposure time has passed.

FIG. 2 shows the configuration of CCD 1 adopted for the present embodiment. In the photoelectric converter section 22, a plurality of photodiodes 21 are arranged in a plural of rows, and a vertical transfer CCD 23 is located along each photodiode row. In the storage section 24, a vertical transfer CCD 25 is provided corresponding to each vertical transfer CCD 23 and temporarily stores electric charge signal of the photodiode row read out and transferred at a high speed through each vertical transfer CCD 23. A clean-out drain 26 is used for cleaning out (draining off, or drawning out) unnecessary electric charges in the photoelectric converter section 22 and the storage section 24 reversely transferred through the vertical transfer CCD 23. A horizontal readout CCD 27 transfers the electric charge signal stored at the vertical transfer CCD 25 to the image processing circuit 17 at a video rate.

Figure 3:
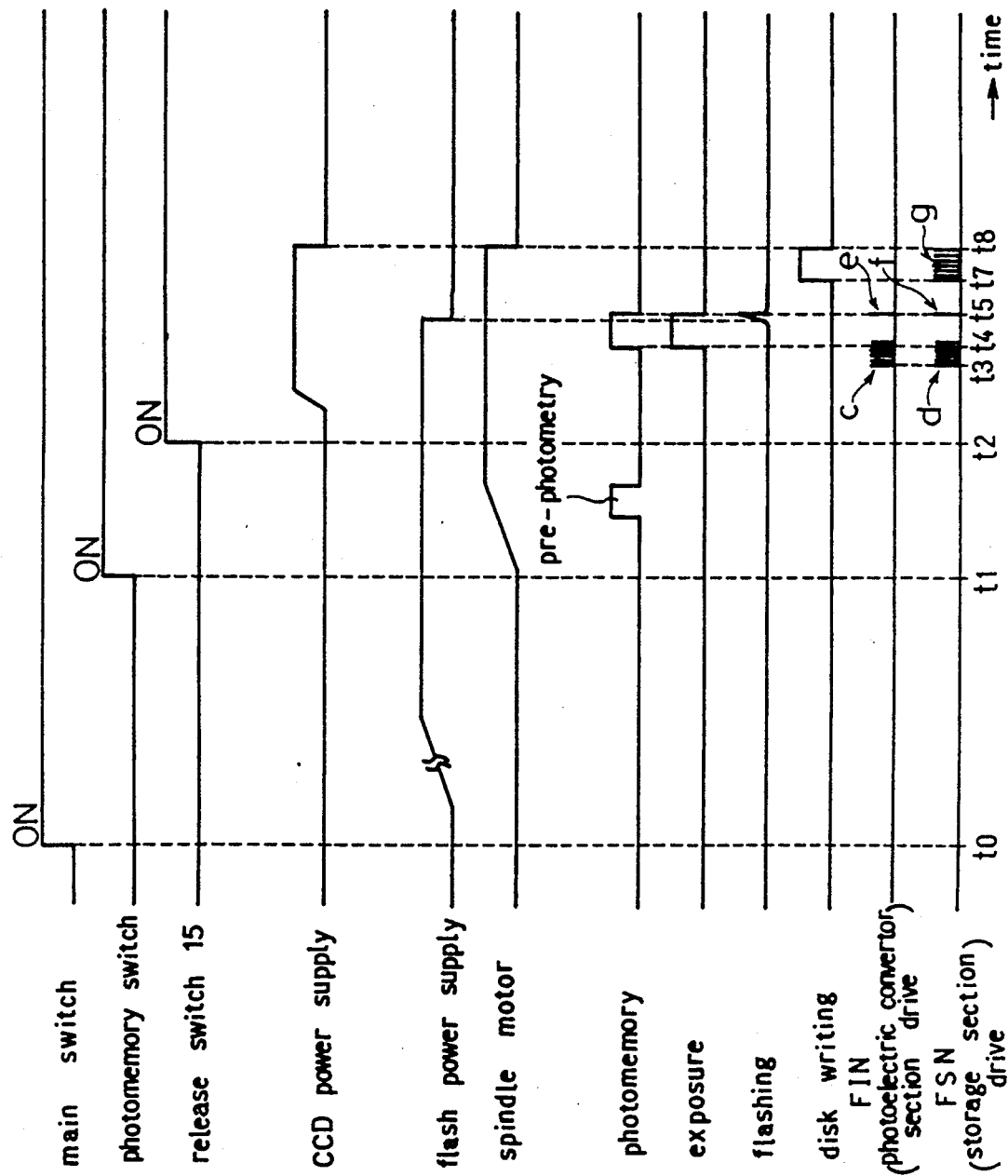
FIG. 3 is a time chart explaining operation of the electronic shutter control device.
Figure 4:
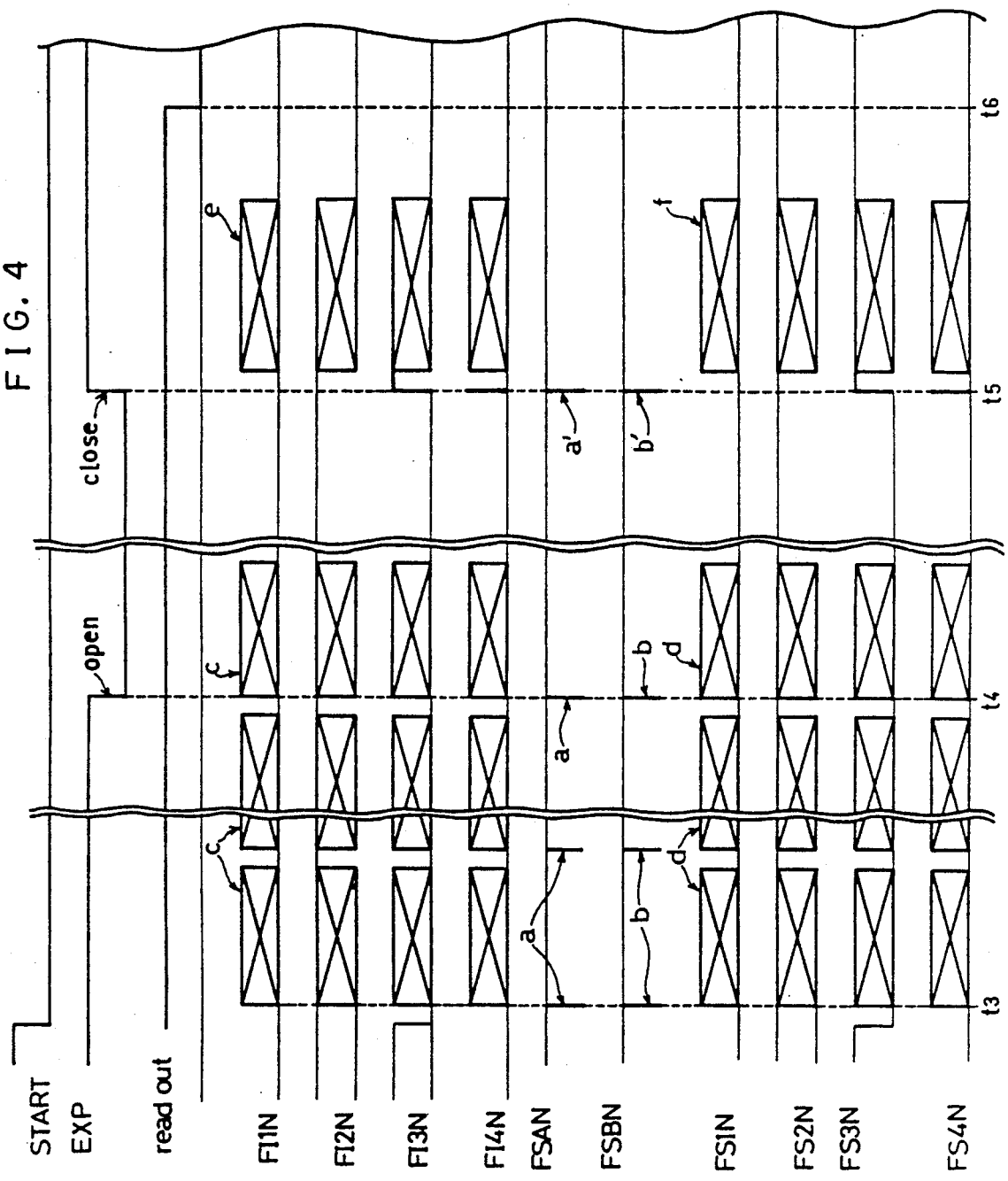
FIGS. 4 and 5 are enlarged time charts of FIG. 3.
Figure 5:
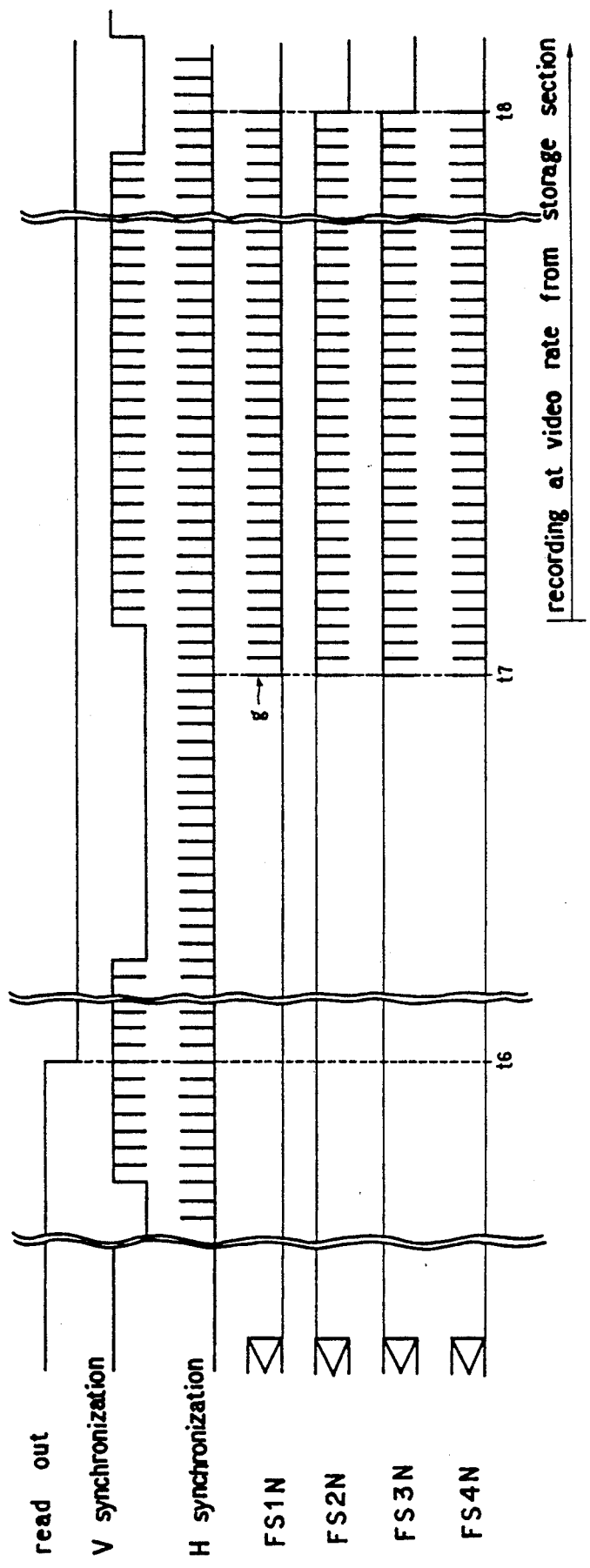

Electronic shutter operations of said configuration will be described in detail in connection with time charts of FIGS. 3 to 5 wherein FIGS. 4 and 5 show enlargements along a time axis of a part of FIG. 3. In these figures, time t0, t1 and t2 correspond respectively to ON timings of the main switch (not shown), the photometric switch (not shown) and the release switch 15. Time t3 shows a generation timing of the first pulse of FASN pulse (a) and FSBN pulse (b) for reading out the stored electric charge (unnecessary electric charge) in the photoelectric converter section 22 and the storage section 24 to the vertical transfer CCD 23 according to the start signal after release switch 15 is ON, and of a first pulse of FIN pulse (c) and FSN pulse (d) executing fast reverse transfer of the unnecessary electric charge from the vertical transfer CCD 23 to the clean out drain 26. As evident from FIG. 4, time t4 corresponds to the last pulse generation timing of FSAN pulse (a) and FSBN pulse (b) for sending the unnecessary electric charge to the vertical transfer CCD 23.

The last pulse of the FSBN pulse (b) is also sent to the EXP signal output circuit 13 of the automatic exposure control circuit 6 to synchronously generate an EXP signal which in turn begins electric charge accumulation at the photoelectric converter section 22. The number of times of the unnecessary electric charge clean out should be determined conveniently (10 times for example) according to the structure of CCD 1. The exposure starts with the timing when an EXP signal shown in FIG. 4 becomes "OPEN". This corresponds to "shutter open". In order to obtain real shutter time by measuring brightness of an object during exposure, a switch 9 of the automatic exposure control circuit 6 is turned off simultaneously with the electric charge accumulation beginning so as to start integration of photoelectric current of the photometric element 7 to the capacitor 8. On the other hand, the last FIN, FSN pulses (c) and (d) are output in order to clean out unnecessary electric charge read out by the last FSAN pulse (a) and FSBN pulse (b) to the vertical transfer CCD 23. These pulses are output as soon as an EXP signal becomes "OPEN".

Once said unnecessary electric charge is cleaned out through fast reverse transfer, the vertical transfer CCD 23 is held at an appropriate potential without outputting FIN and FSN pulses. The reason for this potential hold is to prepare for immediately reading out an electric charge accumulated in the photoelectric converter section 22 to the vertical transfer CCD 23, when an exposure stop signal generated when the amount of exposure measured by the automatic exposure control circuit 6 attains proper exposure to apply an EXP signal "CLOSE" corresponding to shutter close to the timing control circuit 5 and thus FSAN and FSBN pulses (a') and (b') for electric charge signal reading out are output. In other words, the CCD 1 is in a state wherein the read out in response to an EXP signal "CLOSE" is possible, while accumulating the electric charge signal. As shown in FIG. 4, after one unnecessary electric charge clean out, the timing control circuit 5 fixes the potential of the generating FI1N-FI4N and FS1N-FS4N pulses at predetermined level when an EXP signal "OPEN" is input and keeps waiting for input of an EXP signal "CLOSE". This vertical transfer control section may be composed, for example, of a shift register arranging D flip-flops, and execute CCD 1 timing control upon receiving a START signal, an EXP signal and a "readout" signal mentioned later.

Now, operation of the photodiode 21 and the vertical transfer CCD 23 will be described in connection with FIGS. 6 (a) and (b). In FIG. 6(a), supposing respective vertical portions V1-V4 of the vertical transfer CCD 23 to which four-phase driving pulses FI1-FI4 are given, photodiodes PD1-PD4 are connected respectively to the portions V1, V3, V1 and V3. The vertical transfer CCD 23 is driven in four-phase by 3-value level pulses of "LOW", "MIDDLE" and "HIGH". FIG. 6(b) represents the potential of the dotted line X portion of FIG. 6(a) and FIG. 6(c) that of the dotted line Y portion of FIG. 6(a). As evident from these figures, the stored electric charge is read out by setting driving pulses FI1 and FI3 corresponding respectively to the portions V1 and V3, at "HIGH". As vertical transfer CCD drivers 2 and 3 are of an inversion type, pulses FI1 and FI3 are set at "HIGH" through the input of pulses FI1N, FI3N, FSAN and FSBN. Immediately before the stored charge readout, pulses FI1N and FI3N are set at "LOW" in order to keep pulses FI1 and FI3 at "MIDDLE" so that they can be set at "HIGH" anytime. Moreover, the pulse FI2 is set at "LOW" and FI4 at "MIDDLE" in order to absorb potential variation during readout and to avoid undesirable mixing of read out electric charge. For this purpose, the pulse FI2N is kept at "HIGH" and FI4N at "LOW". In this way, potentials of pulses FI1N-FI4N are set at "LOW", "HIGH", "LOW" and "LOW", that is to say, in read out possible state. On the other hand, pulses FS1N-FS4N are in the state to be matched with said FI1N-FI4N.

After starting exposure by shutter open, if proper exposure is not attained at the end of the predetermined time or is expected to be not attained, flashing is executed as shown in FIG. 3 by sending a flashing start signal to the flash control circuit 19. This flash emitting is necessary to restrict the exposure time within the predetermined period of time because too long exposure may increase an undesirable dark current due to the structure of CCD 1. Here, flashing start timing can be obtained through operation of a microcomputer (not shown) based on pre-photometric data measured in response to turn on of the photometry switch S1 before the release switch 15 is ON, and flash boosting for flashing, i.e., flash power supply should de done beforehand as shown in FIG. 3.

The time t5 is a timing of which an exposure stop signal corresponding to shutter close, i.e. EXP signal "CLOSE" is outputted from the EXP signal output circuit 13. Upon receiving EXP signal "CLOSE", FSAN pulse (a') and FSBN pulse (b') are outputted, then, the stored signal electric charge in the photoelectric converter section 22 is readout to the vertical transfer CCD 23. And furthermore, fast transfer to the vertical transfer CCD 25 of the storage section 24 is executed through FIN pulse (e) and FSN pulse (f). At that time, a signal read out from the CCD 1 to outside is inhibited. On the other hand, said EXP signal "CLOSE" can not be sent during the fast reverse transfer of said unnecessary electric charge to the clean out drain 26. As a consequence, this fast reverse transfer time corresponds to the shortest shutter speed. Though a flashing stop signal is output at the same time as said EXP signal "CLOSE" in the present embodiment, the flash may be fully emitted by omitting stop operation of emitting.

The time t6 represents timing when a signal readout output "readout" indicative of completion of readout is given to the timing control circuit 5 from the microcomputer (not shown) after a time necessary to complete transfer of the stored signal electric charge to the storage section 24. Before said "readout" signal is given, the timing control circuit 5 which drives and controls the CCD 1 is operated independently of the vertical and horizontal synchronous signals generated from the synchronous pulse generating section 54 for the video processing circuit 17 and the image recording section 18. While once the "readout" output is given, the timing control circuit 5 is operated synchronously with a TV synchronous signal to read out a signal to outside. That is to say, as shown in FIG. 5, FSN pulse (g) is output at the time t7-t8 after waiting for a vertical synchronous signal, electric charge signal is read out sequentially from the vertical transfer CCD 25 of the storage section 24 to the horizontal readout CCD 27 synchronizing at a video rate and then recorded in the image recording section 18 through the video processing circuit 17. In FIG. 3, this recording operation is represented as writing to a floppy disk. Here, the disk is driven by a spindle motor started to rotate by turning on the photometry switch S1.

On the other hand, each pulse phase of FS1N-FS4N being deviated slightly, image data of one scanning line is obtained by a set of FS1N-FS4N pulses continuous in time and image data of one screen is composed of readout data of the time t7-t8. Moreover, fast reverse transfer of electric charge to the clean out drain 26 and fast transfer of electric charge to the vertical transfer CCD 25 of the storage section 24, can be switched over by phase deviation of each pulse of four phases of FIN and FSN.

FIG. 7 shows another block diagram of a still video camera to which a second embodiment of the present invention is applied. In this figure, the electronic shutter is composed of a CCD 1 as an imaging device for photoelectric conversion, a vertical transfer timing control circuit 5 generating vertical transfer and horizontal transfer pulses respectively in order to drive and control the CCD 1, vertical transfer CCD drivers 2 and 3 and a horizontal transfer timing control circuit 4. The vertical transfer timing control circuit 5 comprises circuit sections for generating respectively four-phase pulses φVN (hereinafter called φVN) with a phase deviated each other, for driving (fast reverse transfer of unnecessary electric charge to clean out drain and fast transfer of signal electric charge to storage section) the vertical transfer CCDs 23 and 25 shown in FIG. 2, a pulse FSPN (hereinafter called FSPN) for transferring an electric charge of the photoelectric converter section 22 to the vertical transfer CCD 23, a signal EXP1 (hereinafter called EXP1) for giving a charge accumulation start to the CCD 1, in other words, giving shutter open timing and a vertical synchronous pulse $V_{SYNC}$ for φVN. Vertical transfer CCD drivers 2 and 3 supply φV and FSP to the CCD 1 according to φVN and FSPN while the horizontal transfer timing control circuit 4 outputs pulses φH which drive the horizontal readout CCD 27. An EXP1 signal becomes "HIGH" by ON signal of the release switch 15 and "LOW" by being synchronized with the predetermined FSPN.

The photometry section 60 having a function to execute pre-photometry before exposure onto the CCD 1 and to execute real time photometry during exposure, is switched over from pre-photometry to real time photometry at a timing when the EXP1 signal is changed from "HIGH" to "LOW" as later mentioned and then outputs a signal EXP2 (hereinafter called EXP2) giving the timing to stop the fast reverse transfer of unnecessary electric charge to the clean out drain. As shown in the figure, this photometry section 60 is composed of a pre-photometry section, a real time photometric section, an operational amplifier 64 and a comparator 65. And the pre-photometry section comprises a pre-photometric element D1, an operational amplifier 61, resistors R, a correction voltage source 62, a photometry switch S1 and a capacitor C1. The real time photometry section comprises a real time photometric element D2, an operation amplifier 63, a capacitor C2, and a switch S2.

The flash control circuit 19 controls flash by receiving EXP2 signal and a signal outputted from the timer 14 to which the EXP1 is inputted. The video processing circuit 17 receives a signal electric charge which is read out from the horizontal readout CCD 27 of the CCD 1, and converts it into a signal for image-recording on the image recording section 18 such as a magnetic floppy disk. The power supply section 100 provides each part of the circuit with power by receiving ON signal from the release switch 15.

Now the operation of the electronic shutter of the configuration will be described in connection with time chart of FIG. 8.

(1) Unnecessary electric charge clean-out period

When the release switch 15 is turned on, each part of the circuit is supplied with power and FSPN and φVN are given to the drivers 2 and 3 so as to drive the CCD 1. In other words, by the FSPN, unnecessary electric charge stored in the CCD 1 is transferred to the vertical transfer CCD 23 and fast reverse-transfer to the clean-out drain is executed by φVN. Clean-out by φVN is repeated several times (n times) in order to prevent any remaining unnecessary electric charge. At this time, EXP1 is at "HIGH" and the switches S1 and S2 are in ON state.

(2) Signal electric charge accumulation period

EXP1 is switched from "HIGH" to "LOW" synchronously with the n-th FSPN and unnecessary electric charge is transferred to the vertical transfer CCD 23 with φVN in order to start accumulation of signal electric charge (shutter open). Unnecessary electric charge transferred to the vertical transfer CCD 23 is cleaned out through fast reverse transfer to the clean-out drain 26. At this time, the fast transfer is continued so as to clean out as much smear component (unnecessary electric charge) generated in vertical transfer CCD 23, as possible. By the way, the potential at the vertical transfer CCD 23 should be ready to be able to receive electric charge in order to read out the stored signal electric charge to the vertical transfer CCD 23. Now, suppose the time required from the fast reverse transfer stop to the state enabling read out of a signal electric charge to the vertical transfer CCD, is T (constant). Even if it is commanded to read out the signal electric charge to the vertical CCD when proper exposure is realized through real time photometry from shutter open, electric charge storage will continue during the time T, resulting in overexposure of this much from the proper exposure value. However, since the brightness of the object is known by the real time photometry, the amount of over-exposure during the time T can be determined. Then, if the reverse transfer stop command is given at a lower level by said exposure during T, the readout signal can be proper exposure because the readout of signal electric charge to the vertical transfer CCD will be executed time T later. Although the switches S1 and S2 are turned off by the timing at which said EXP1 is changed from "HIGH" to "LOW", by measuring brightness of the object in advance of turn off these switches by a pre-photometric element D1, a lower voltage than proper exposure level by the exposure which may be obtained during time T is generated through the correction voltage source 62 and held in the capacitor C1. On the other hand, the real time photometry by the real time photometry element D2 and the capacitor C2, starts with the release switch 15 ON at the same time as the electric charge accumulation starts. When integration of the real time photometric value reaches a level held in the capacitor C1, i.e., a lower level than proper exposure level by the exposure which may be obtained during the time T, the output from the comparator 65, that is EXP2, is changed from "HIGH" to "LOW". This EXP2 signal stops the fast reverse transfer, generates FSPN after the time T and transfers the signal electric charge to the vertical transfer CCD 23 (shutter close).

(3) Standby period after fast transfer to storage section

A signal electric charge transferred to the vertical transfer CCD 23 is fast transferred to the storage section 24 by φVN, and the storage section 24 waits for the vertical synchronous signal $V_{SYNC}$ being inputted.

(4) Signal processing and recording period

After $V_{SYNC}$ input, a signal electric charge is read out from the horizontal readout CCD 27 of the CCD 1 to the image processing circuit 17 synchronously with a TV synchronous signal, converted into a signal for image-recording and recorded in the recording section 18.

Now, the shortest shutter speed will be described.

Unnecessary electric charge is transferred to the vertical transfer CCD 23 when EXP1 is switched from "HIGH" to "LOW", but signal electric charge to be image-recorded can not be transferred to the vertical transfer CCD 23 until the complete end of the unnecessary electric charge clean-out. Therefore, if one single clean-out needs time Tr, the shortest shutter speed will be Tr+T. If EXP2 is switched from "HIGH" to "LOW" during the time Tr, Tr+T will automatically be the shortest shutter speed.

Now, cases when a flash is used, will be described. A flash is allowed to emit with time Tr delayed from timing of "HIGH" to "LOW" of EXP1. This is for preventing EXP2 from changing from "HIGH" to "LOW" during the time Tr. On the other hand, flash emitting is made stop with the timing of EXP2 changing from "HIGH" to "LOW".

FIG. 9 is a configuration of a third embodiment.

This embodiment is different from the second embodiment, in the configuration of the photometry section 60 and the photometric timing operation. The photometry section 60 is composed of a photometric element D0, an operational amplifier 66, a voltage source E corresponding to the proper exposure level, a switch S0 turning on and off to connect or disconnect the voltage source E by the signal EXP0, a capacitor C0 charged by the voltage source E, a transistor Q discharging the electric charge of the capacitor C0 according to the output of the operational amplifier 66, and a comparator 65 operated by the voltage of the capacitor C0 and outputting EXP2. In the second embodiment, the fast reverse transfer is stopped at a lower exposure level than the proper exposure level by an exposure level during the time T, whereas in this embodiment, integration of the real time photometry value starts earlier by time T than the beginning of electric charge accumulation in the CCD and the fast reverse transfer stops when the proper exposure is attained by photometry. In this case, as the electric charge accumulation to the CCD starts later by time T than the photometry beginning, when the fast reverse transfer stops, the exposure lacks by the amount corresponding to the time T, but when the actual signal electric charge accumulation is completed, the proper exposure will be realized, as the actual accumulation completes later by time T than EXP2 changeover from "HIGH" to "LOW".

The operation of the photometry section 60 of the electronic shutter of this embodiment will be described in connection with the time chart of FIG. 10.

(1) Unnecessary electric charge clean-out period

When the release switch 15 is turned on, EXP0 changes from "LOW" to "HIGH" and the switch S0 turns on. In this condition, the capacitor C0 is charged with the voltage source E corresponding to the proper exposure level. By changing EXP0 from "HIGH" to "LOW" earlier by time T than the beginning of the signal electric charge accumulation with the timing of EXP1 changeover from "HIGH" to "LOW" by n-th FSPN, switch S0 is switched off, and thus the photometry is started. During the photometry, the electric charge of the capacitor C0 is discharged through the transistor Q according to the light received by the element D0.

(2) Signal electric charge accumulation period

EXP1 changes from "HIGH" to "LOW" at a timing of n-th FSPN, i.e., later by time T than the timing of EXP0 changeover from "HIGH" to "LOW", to start electric charge accumulation in the CCD 1 (shutter open). When the capacitor C0 has been completely discharged, EXP2 changes from "HIGH" to "LOW" to stop the fast reverse transfer which cleans out the unnecessary electric charge of the CCD 1 by $\phi$VN. Thereafter, the CCD 1 continues to accumulate the signal electric charge during the time T and transfers the electric charge to the vertical transfer CCD 23 by FSPN (shutter close). The description of the subsequent operations is omitted because they are the same as mentioned before. Referring to said operation, the relation between the photometric element D0 and exposure of CCD 1 will be explained as below. Only the photometric element D0 receive light during the time T from EXP0 "HIGH" to "LOW" switching, to EXP1 "HIGH" to "LOW" switching (shutter open), whereas only the CCD 1 receive light during the time T from EXP2 "HIGH" to "LOW" switching, to FSPN (shutter close). Exposures during said both periods should, therefore, be equal. For this purpose, flash is controlled to emit between EXP1 "HIGH" to "LOW" switching and EXP2 "HIGH" to "LOW" switching.

In these embodiments shown respectively in FIGS. 7 and 9, the charge accumulation time is controlled by the received light amount of photometric element other than the CCD 1 during the electric charge accumulation in the CCD 1, but it may also be controlled by calculating the proper exposure time according to the received light before the accumulation starts. In this case, the proper exposure time $2^{-Tv}$ based on the received light signal of the photometric section 22 (here, Tv is an APEX value of exposure time, i.e., accumulation time) is calculated in advance of the charge accumulation start and a charge accumulation stop signal is output after the time $2^{-Tv}$ has passed. Moreover, in flash photography, flashing start timing is determined such that full emission has completed at the passage of time $2^{-Tv}$, and the flashing stop signal is outputted when the amount of received light, reflected by the object and receive and integrated by a photometric element other than the CCD 1, reaches the predetermined level.

FIG. 11 shows the configuration of a photometric section wherein such modification is implemented. This photometry section comprises a spot photometry section 71 measuring the brightness $B_{vs}$ of an object located at the center of the picture, a peripheral photometry section 72 measuring the brightness $B_{va}$ of peripheral object, an exposure calculation section 73 receiving respective photometric values $B_{vs}$ and $B_{va}$, a timer I receiving calculated output from the exposure calculation section 73 and EXP1 and outputting EXP2, a timer II receiving the calculated output and EXP1, a photometric section 74 controlling flash emitting, etc. This photometric section 74 is composed of a photometric element 75, a capacitor 76, a switch 77, an operation amplifier 78 and a comparator section 79. Here, AND output of a flash enable (EN) signal from the exposure calculation section 73 and signal from the timer II permits to start flash emission and to turn off the switch 77 which in turn starts charging the capacitor 77. Moreover, a flashing stop signal of flash emitting is outputted by comparing the output from the operation amplifier 78 with the D/A converted output from the exposure calculation section 73 by the comparator 79.

The flow chart of FIG. 12 shows the operation procedure in the exposure calculation section 73. This operation proceeds as follows. First, the difference $\alpha$ [APEX value] between the spot brightness Bvs and the peripheral brightness Bva is determined (#1), and if $\alpha$ is smaller than 2 (in this case, object is in a normal light state), the program proceeds to #3, and if $\alpha$ is not less than 2 (in this case, object is in a back-light state) the program proceeds to #14. For front light, a mean value is calculated from Bvs and Bva (#3) and taking this mean value as Bvc, the exposure time Tv [APEX value] is calculated by Bvc+Svc−Avc, where Svc represents a CCD sensitivity and Avc represents an aperture value of photographing optical system [both APEX values]. Then, Tv and camera-shake limit time Tvh are compared and if Tv is smaller than Tvh, the program proceeds to low brightness front light processing starting from #6 to #10 and if Tv is not smaller than Tvh, high brightness front light processing starting from #17 to #13 will be executed. As for low brightness front light mode, proper exposure is realized by using the Tvh as exposure time control value Tvc (#6) and then enables the flash emission (#7). Then, $2^{-Tvc}-T$ is set to the timer I which determines shutter close EXP2 (#8) and $2^{-Tvc}-T-Tf$ (where Tf is a full emission time of flash) is set to the timer II which determines flash emission start timing (#9). CCD sensitivity Svc is outputted (#10) to a D/A conversion section which output is applied to the comparator 79 for outputting the flashing stop signal. In the high brightness front light mode, exposure time is controlled by Tv value based on the mean photometric value calculated in #4 (#11), the flash is set non emitting (#12) and $2^{Tvc}-T$ is set in the timer I (#13).

In back-light mode, Bva+Svc−Avc−1 is taken as Tv to control the time so that exposure onto the peripheral becomes 1 Ev over-exposure (#14). Then, Tv is limited by camera-shake limit time Tvh (#15 to #17) and flash emitting is enabled (#18). Moreover, the timers I and II are set as in said #8 and #9 (#19 and #20), Tvc+Avc−Svc−Bvs as corrected value $\beta$ is obtained (#21) and D/A conversion output of Svc+$\beta$ is obtained (#22) is given to the comparator 79 as mentioned before. The amount of flash emission, therefore, is controlled as much as the object located at the center will have an appropriate exposure, taking the central brightness Bvs into consideration.

FIG. 13 shows the configuration of a fourth embodiment of an electronic camera with the electronic shutter according to the present invention.

This embodiment is different from the first embodiment in that a timer 14b is provided in the automatic exposure control circuit 6. A field shift pulse FSP which is input to a EXP signal output circuit 13 is the last pulse of the FSBN pulse (b).

The timer 14b counting the fastest shutter speed or the shortest exposure time, starts counting when an EXP signal changes from "HIGH" to "LOW" and outputs a "LOW" exposure stop inhibiting signal until the counting is completed. During this counting period, exposure will not be stopped even if the photometric circuit 6a generates an exposure stop signal EXP-STOP, and transfer of the electric charge being accumulated in the CCD 1 to the vertical transfer CCD 23 is inhibited.

FIG. 14 shows a detailed circuit diagram of the EXP signal generating circuit 13. The circuit 13 receives a field shift pulse FSP, a release start signal START, an initialization signal INIT, an exposure stop signal EXP-STOP output from the photometric circuit 6a and an exposure stop inhibition signal output from the timer 14b, and outputs an exposure signal EXP. A counter 13a counts the time Tr necessary to clean out CCD unnecessary electric charge. After the START signal, the circuit 13 sets an exposure signal EXP at "LOW" synchronously with FSP after a certain time passage counted by said counter 13a, and thereafter, sets EXP at "HIGH" through the input of EXP-STOP signal with the exposure stop inhibition signal at "HIGH".

Now, the operation of the fourth embodiment will be described referring to FIG. 15. When a release button (not shown) is depressed, the photometry starts upon turn on of the photometric switch (not shown), the timer 16 starts counting upon turn on of the release switch 15 to output the START signal after the power supply start-up time (state I) to the timing control circuit 5 and the AE control circuit 6. Receiving this START signal, the timing control circuit 5 enters a repeating state of fast reverse transfer (FI, FS) and field shift (FSP), that is to say, unnecessary electric charge clean-out state (state II). As for the AE control circuit 6, receiving the START signal, the EXP signal generating circuit 13 counts the time from generation of the START signal and, after a sufficient period of time Tr to clean out unnecessary electric charge, sets an exposure signal EXP at "LOW" synchronizing with the FSP signal, and the photometry circuit 6a starts photometric integration. The timing control circuit 5 shifts to the state III when the exposure signal EXP is set at "LOW", executes a single fast reverse transfer, then enters an exposure stop wait state. Now, the flash control circuit 19 emits the flash after passage of a certain period of time from EXP changed to "LOW". As for the flash, flash emission is inhibited if the exposure time is shorter than the flash emitting start timing. On the other hand, the photometry circuit 6a outputs an EXP-STOP signal when photometric integration is completed. Operations of the EXP signal generating circuit 13 relating to the EXP-STOP signal are different depending on output timing of the EXP-STOP signal as described below.

(a) When EXP-STOP signal is output after the end of the fast reverse transfer;

Receiving EXP-STOP signal, the EXP signal generating circuit 13 sets the EXP at "HIGH" to stop the electric charge accumulation in the CCD 1.

(b) When EXP-STOP signal is output during the fast reverse transfer;

During the fast reverse transfer, the exposure stop inhibition signal output from the timer 14b being set at "LOW", the EXP does not shift to "HIGH" even if the EXP-STOP signal is outputted, whereas after the fast reverse transfer completion, when the exposure stop inhibition signal becomes "HIGH", the EXP becomes "HIGH" to stop the electric charge accumulation of the CCD 1.

In this way, even if the object brightness is high and the exposure time is shorter than the fast reverse transfer time, exposure control can be realized though slight overexposure compared to the proper exposure level may occur. As for the timing control circuit 5, when the EXP shifts to "H", the circuit 53 (hereinafter referred to a field shift pulse generating circuit 53) outputs a field shift pulse FSP and enters the state IV, and then, the vertical transfer pulse generating circuit 52 generates the pulse which permits fast transfer of signal electric charge from image section of the CCD 1 to the storage section. Thereafter, signal electric charge of the CCD 1 is read out synchronously with a TV synchronous signal generated separately, processed in the video processing circuit 17 so as to be recordable and then recorded in the recording section 18.

Now, a fifth embodiment will be described referring to FIG. 16. This embodiment is different from the fourth embodiment in that it does not use the timer 14b used in the previous one and that the timing control circuit 5 comprises a shutter close timing generating circuit 55. An example of the circuit 55 is shown in FIG. 17. The shutter close timing generating circuit 55 receives a reverse transfer end signal RTF END, a clock signal CK2, an initialization signal INIT and an exposure signal EXP, and outputs a signal FS ON which controls a field shift pulse. In other words, the circuit 55 stores an EXP signal switching from "LOW" to "HIGH", i.e., shutter close signal which is output from the AE control circuit 6, then receives a reverse transfer end signal RTF END ("LOW" to "HIGH") from the vertical transfer pulse generating circuit 52 and commands output of a field shift pulse corresponding to shutter close, to the field shift pulse generating circuit 53.

As for the operation of the present embodiment, as is the case of the fourth embodiment, the state shifts to III through I and II of the time chart in FIG. 15 and to the exposure stop wait state, and the EXP signal generating circuit 13 sets an EXP signal at "HIGH" receiving an EXP-STOP signal from the photometric circuit 6a to stop the electric charge accumulation of the CCD 1.

Here, the operation of the EXP signal generating circuit 13 is different depending on the timing at which an EXP signal shifts to "HIGH".

(a) When EXP signal is shifted to "HIGH" after the completion of fast reverse transfer;

The shutter close timing generating circuit 55 sends a field shift pulse output command to the field pulse generating circuit 53 when the EXP signal shifts to "HIGH". With this command, the circuit 53 outputs a field shift pulse, and thereafter, the vertical transfer pulse generating circuit 52 fast transfers signal electric charge from the CCD 1 image section to the storage section.

(b) When EXP signal is shifted to "HIGH" during the fast reverse transfer;

The EXP signal having shifted to "HIGH", the shutter close timing generating circuit 55 stands by until the fast reverse transfer end pulse is input. After being inputted of the fast reverse transfer end pulse, the output command of said pulse is sent to the field shift pulse generating circuit 53. When this pulse is input, the circuit 53 outputs a field shift pulse, and thereafter, the vertical transfer pulse generating circuit 52 outputs pulses for fast transferring the signal electric charge from the CCD 1 image section to the storage section. In this way, as aforementioned, even if the object brightness is high and the exposure time is shorter than the fast reverse transfer time, exposure control can be realized though slight overexposure compared to the appropriate one may occur. In both cases, thereafter, signal electric charge is read out synchronously with a TV synchronous signal generated independently, processed as necessary for recording in the video processing circuit 17, and then recorded in the recording section 18.

Further, a sixth embodiment will be described referring to FIG. 18. This embodiment is similar to the abovementioned second embodiment shown in FIG. 7. However, this embodiment is so modified that a timer 69 and switch 69' are provided in a photometry section 60. The switch 69' is interposed on an outline of a comparator 65, and driven by an output of the timer 69. The timer 69 is for counting shortest exposure time, commences the count operation with an input of EXP1, and forbids outputting EXP2 signal until the timer 69 terminates the count operation.

Also, in this embodiment, as like the abovementioned embodiment shown in FIG. 16, even if an exposure time is shorter than the fast reverse transfer time, correct exposure control can be realized.

What is claimed is:

1. An electronic shutter control device comprising: an imaging device; a drive circuit for driving said imaging device; and an exposure control circuit which outputs to said drive circuit a signal to stop an exposure onto said imaging device when an exposure amount attains a predetermined level, wherein:

said imaging device comprises a photoelectric converter section, a vertical transfer section and a horizontal transfer section, an exposure onto said imaging device being started synchronously with a signal outputted from said drive circuit for readout of unnecessary electric charge in the photoelectric converter section before the exposure start to the vertical transfer section, and said drive circuit once cleans out unnecessary electric charge in said vertical transfer section in a state enabling readout of electric charge in said photoelectric converter section after exposure start, so as to wait for the output of the exposure stop signal from said exposure control circuit.

2. A method for controlling an electronic shutter used for an imaging device including a photoelectric converter section, a vertical transfer section and a clean-out drain for cleaning-out unnecessary electric charge, said method comprising:

starting transfer of unnecessary electric charge in the photoelectric converter section to the clean-out drain through the vertical transfer section and thereafter stopping the transfer of unnecessary electric charge in the photoelectric converter section to the vertical transfer section to start an exposure onto the photoelectric converter section;

stopping transfer of unnecessary electric charge in the vertical transfer section to the clean-out drain when the exposure amount onto the photoelectric converter section attains a predetermined level; and reading out an electric charge in the photoelectric converter section to the vertical transfer section after a certain period of time necessary for the potential of the vertical transfer section of said imaging device to attain a level enabling reception of the electric charge.

3. A method for controlling an electronic shutter as defined in claim 2, which further comprises:

starting a flash emission before the exposure amount attains the predetermined level; and stopping the flash emission at a time when said transfer to the clean-out drain is stopped.

4. A method for controlling an electric shutter comprising:
- an imaging device having a photoelectric converter section, a vertical transfer section and a horizontal transfer section;
- a drive circuit for driving said imaging device; and
- an exposure control circuit which outputs to said drive circuit a signal to stop an exposure onto said imaging device when an exposure amount attains a predetermined level, said method comprising:
- starting an exposure synchronously with a signal outputted from said drive circuit for readout of unnecessary electric charge in the photoelectric converter section to the vertical transfer section;
- stopping clean-out of the unnecessary electric charge in the vertical transfer section of the imaging device when the exposure amount onto said imaging device attains a predetermined level; and
- reading out an electric charge in the photoelectric converter section to the vertical transfer section after a certain period of time necessary for the potential of the vertical transfer section of said imaging device to attain a level enabling reception of the electric charge.

5. An electronic camera provided with the electronic shutter comprising:
- an imaging device including a photoelectric converter section and a transfer section and functioning to clean out unnecessary electric charge through the transfer section;
- a photometry circuit;
- an electronic shutter which controls the transfer of the electric charge in the photoelectric converter section and in the transfer section of the imaging device based on the output of said photometry circuit and determines the effective exposure time of a photoelectric converter section;
- control means responsive to a shutter open signal related to a shutter release for starting accumulation of the electric charge in the photoelectric converter section, and cleaning out unnecessary electric charge in the transfer section based on the shutter open signal related to the shutter release; and
- inhibiting means or inhibiting the transfer of the accumulated electric charge in the photoelectric converter section until completion of clean out of the unnecessary electric charge even if a shutter close signal is outputted based on an output of said photometry circuit.

* * * * *